(12) United States Patent
Masuda et al.

(10) Patent No.: US 12,534,204 B2
(45) Date of Patent: Jan. 27, 2026

(54) DOOR OPENING/CLOSING MECHANISM IN LAVATORY UNIT FOR AIRCRAFT

(71) Applicant: The Yokohama Rubber Co., LTD., Kanagawa (JP)

(72) Inventors: Mitsutaka Masuda, Kanagawa (JP); Mitsuaki Takeda, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/713,933

(22) PCT Filed: Oct. 27, 2022

(86) PCT No.: PCT/JP2022/040080
§ 371 (c)(1),
(2) Date: May 28, 2024

(87) PCT Pub. No.: WO2023/100550
PCT Pub. Date: Jun. 8, 2023

(65) Prior Publication Data
US 2025/0033773 A1    Jan. 30, 2025

(30) Foreign Application Priority Data
Dec. 2, 2021    (JP) ................................. 2021-196349

(51) Int. Cl.
*B64D 11/02*        (2006.01)
*E05D 15/26*        (2006.01)
(Continued)

(52) U.S. Cl.
CPC ............ *B64D 11/02* (2013.01); *E05D 15/264* (2013.01); *E05F 15/60* (2015.01); *E05F 15/73* (2015.01); *E05Y 2900/112* (2013.01)

(58) Field of Classification Search
CPC .......... E05Y 2900/112; E05Y 2900/502; E05F 15/611; E05F 15/60; E05F 15/73; E05D 15/264; B64D 11/02
See application file for complete search history.

(56) References Cited

U.S. PATENT DOCUMENTS 8,141,296 B2 * 3/2012 Bem .................... E05B 65/0035
                                                                49/340
9,399,883 B2 * 7/2016 Swoboda ................ E05D 15/26
(Continued)

FOREIGN PATENT DOCUMENTS

DE    102018113132 A1    12/2019
JP       39-17791 Y1      6/1964
(Continued)

*Primary Examiner* — Justin B Rephann
(74) *Attorney, Agent, or Firm* — Thorpe North & Western

(57) ABSTRACT

A powered door opening mechanism to move an aircraft lavatory door from the closed position to the open position is provided, which includes a non-contact sensor inside and outside the lavatory to detect part of a human body, an engaged member in the door and extending to an upper side of the door, an engaging member at a section on the upper side of the door inside the lavatory, engageable with the engaged member from a side of the door from the closed position of the door to the open position of the door, and having a shape that is open in a direction away from the door, and an actuator to move the engaging member in a direction away from the entrance in response to a detection signal from the non-contact sensor and move the door from the closed position to the open position through the engaged member.

9 Claims, 22 Drawing Sheets

(51) Int. Cl.
*E05F 15/60* (2015.01)
*E05F 15/73* (2015.01)

(56) References Cited

U.S. PATENT DOCUMENTS

| | | | |
|---|---|---|---|
| 10,648,208 B2* | 5/2020 | Eickhoff | G07C 9/00174 |
| 2011/0080252 A1* | 4/2011 | Ibsies | E05F 15/74 |
| | | | 340/3.1 |
| 2013/0146232 A1 | 6/2013 | Swoboda | |
| 2014/0196372 A1 | 7/2014 | Boren et al. | |
| 2015/0300054 A1 | 10/2015 | Seibt et al. | |
| 2016/0325817 A1* | 11/2016 | Buttelmann | E05F 15/611 |
| 2021/0331800 A1* | 10/2021 | Dhanapal | B65F 1/1638 |
| 2021/0332627 A1* | 10/2021 | Brunner | E05D 15/264 |
| 2021/0363798 A1* | 11/2021 | Subramanian | B64C 1/1407 |
| 2023/0083772 A1* | 3/2023 | Chadwell | E05B 65/0035 |
| | | | 244/206 |
| 2023/0272646 A1* | 8/2023 | Müller | E05B 83/00 |
| | | | 244/129.5 |
| 2023/0332454 A1* | 10/2023 | Stolle | B64C 1/1407 |

FOREIGN PATENT DOCUMENTS

| | | |
|---|---|---|
| JP | S39-17791 Y1 | 6/1964 |
| JP | 2013-224525 A | 10/2013 |
| JP | 2019-183537 A | 10/2019 |

\* cited by examiner

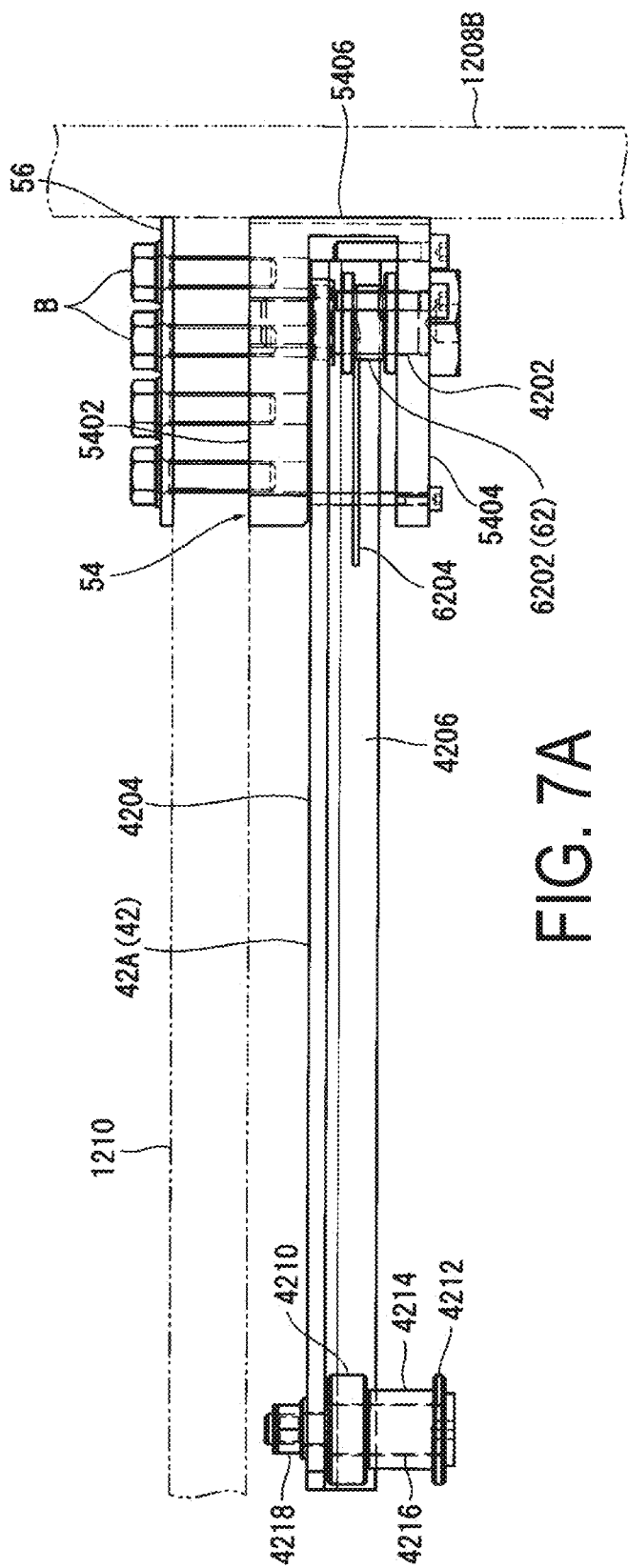
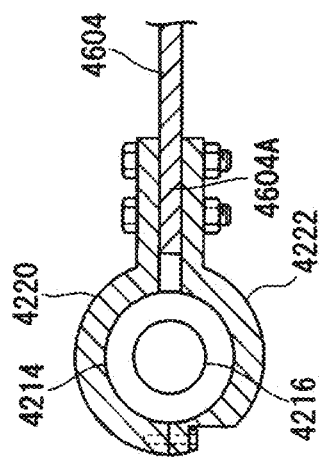
FIG. 7A
FIG. 7B

DOOR OPENING/CLOSING MECHANISM IN LAVATORY UNIT FOR AIRCRAFT

TECHNICAL FIELD

The present technology relates to a door opening and closing mechanism of an entrance of an aircraft lavatory unit.

BACKGROUND ART

A door for opening and closing an entrance of an aircraft lavatory unit is always biased by a spring to the closed position for closing the entrance and is configured such that the entrance is opened by manually moving the door from the closed position to the open position.

In recent years, measures to prevent transmission of novel coronavirus have been widely implemented in many countries around the world. Many of the transmission of novel coronavirus is said to be caused by the virus adhering to hands and fingers through contact with objects and then touching the eyes, nose, or mouth with those hands and fingers.

Measures against the transmission of novel coronavirus are preferably taken also in an interior of the aircraft.

The present inventor has focused on the door for opening and closing the entrance of the aircraft lavatory unit that is manually opened and closed and has considered that it would be advantageous in preventing the transmission of novel coronavirus in the interior if the user can enter and leave the aircraft lavatory unit without contacting the door.

SUMMARY

It is considered that it would be more advantageous in preventing the transmission of novel coronavirus in the interior if it could be easily installed in aircraft lavatory units of existing aircraft already in operation, not to mention that it could be installed in newly manufactured aircraft including aircraft lavatory units.

In view of the above-described circumstances, the present technology provides a door opening and closing mechanism of the entrance of an aircraft lavatory unit that can be easily installed in aircraft lavatory units of existing aircrafts already in operation, and is advantageous in preventing the transmission of novel coronavirus in the interior.

An embodiment of the present technology is a door opening and closing mechanism of an entrance of an aircraft lavatory unit including a door manually movable between a closed position for closing the entrance of a lavatory and an open position for opening the entrance and always biased to be at the closed position and powered door opening mechanism configured to move the door from the closed position to the open position. The powered door opening mechanism includes a non-contact sensor provided inside and outside the lavatory and configured to detect part of a human body, an engaged member provided in the door and disposed on an inner surface side of the door located inside the lavatory and on an upper side of the door, an engaging member provided at a section on an upper side of the door inside the lavatory, engageable with the engaged member from a side of the door from the closed position of the door to the open position of the door, and having a shape that is open in a direction away from the door, and an actuator configured to move the engaging member in a direction away from the entrance in response to a detection signal from the non-contact sensor and move the door from the closed position to the open position through the engaged member.

According to the present technology, the user can enter and leave the aircraft lavatory unit without contacting the door with the powered door opening mechanism provided in the door opening and closing mechanism of the existing aircraft lavatory unit, which is advantageous in easily installing the powered door opening mechanism in aircraft lavatory units of existing aircrafts already in operation, not to mention that the powered door opening mechanism can be installed together with the door opening and closing mechanism when newly manufacturing aircraft lavatory units, and is advantageous in preventing the transmission of novel coronavirus in the interior.

The engaging member is provided to engage with the engaged member from the door side and open in the direction away from the door, and as such the engaged member does not engage with the engaging member when the door is manually moved from the closed position to the open position.

Thus, the door can be moved from the closed position to the open position with the powered door opening mechanism while ensuring the state where the manual opening operation of the door is enabled.

Therefore, during maintenance of the aircraft lavatory unit, the worker can manually perform the opening operation of the door even in the state where the operation of the actuator is stopped by stopping the power supply to the actuator, which is advantageous in smoothly efficiently performing the maintenance operation.

Even if there is a user (passenger) who is unaware of the non-contact sensor, the user can manually move the door from the closed position to the open position as in the related art without interfering with the powered door opening mechanism, which is advantageous in increasing the user-friendliness of the door opening and closing mechanism of the entrance of the aircraft lavatory unit.

Even if the powered door opening mechanism is in a fault state, the opening operation of the door can be manually performed, and therefore the user of the lavatory can use the lavatory without any trouble, which is advantageous in improving the convenience of the aircraft lavatory unit.

Since the door is moved to the open position by moving the engaging member in the direction away from the entrance at the closed position of the door, the door can be moved from the closed position to the open position in both the case where the first door member and the second door member linearly extend, and the case where the part where the first door member and the second door member are coupled is shifted in the direction away from the lavatory from the both ends of the door in the width direction, at the closed position of the door in plan view.

Thus, the powered door opening mechanism can be provided in the door opening and closing mechanism of the existing aircraft lavatory unit, and the user can enter and leave the lavatory without contacting the door regardless of the close state of the door, which is advantageous in preventing the transmission of novel coronavirus in the interior.

BRIEF DESCRIPTION OF DRAWINGS

FIG. 4A is a perspective view of the attaching state of the bracket and the roller, and FIG. 4B is a plan view of the same.

FIG. 7A is a side view of an attaching state of an arm making up an engaging member, and FIG. 7B is a cross-sectional plan view of a state where an end portion of a belt is attached to a roller at an end of the arm.

DETAILED DESCRIPTION

An embodiment of the present technology is described below.

Figure 1:
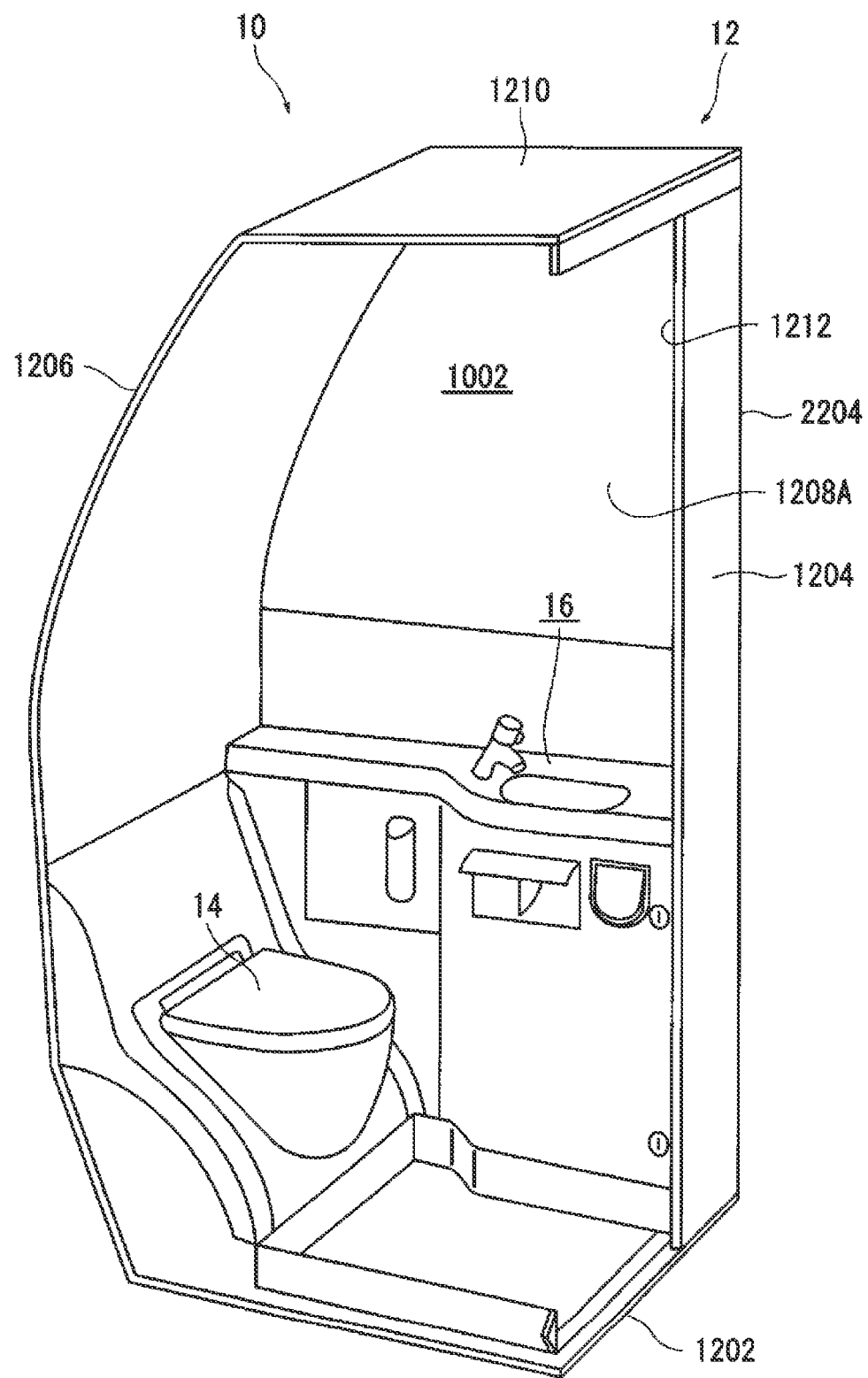
FIG. 1 is a perspective view of the inside of a lavatory of an aircraft lavatory unit of a first embodiment in which illustration of one side wall and a door is omitted.

As illustrated in FIG. 1, a housing 12 of an aircraft lavatory unit 10 includes a floor board 1202, a front wall 1204 and a rear wall 1206 standing upright from the floor board 1202 and facing each other, a first side wall 1208A and a second side wall 1208B standing upright from the floor board 1202 and connecting both sides of the front wall 1204 and the rear wall 1206 (see FIG. 11), and a ceiling wall 1210, a toilet 14 is provided at the floor board 1202 at a location of relatively closer to the rear wall 1206, a sink 16 is provided at the first side wall 1208A, and thus the interior of the housing 12 is a lavatory 1002.

Figure 2:
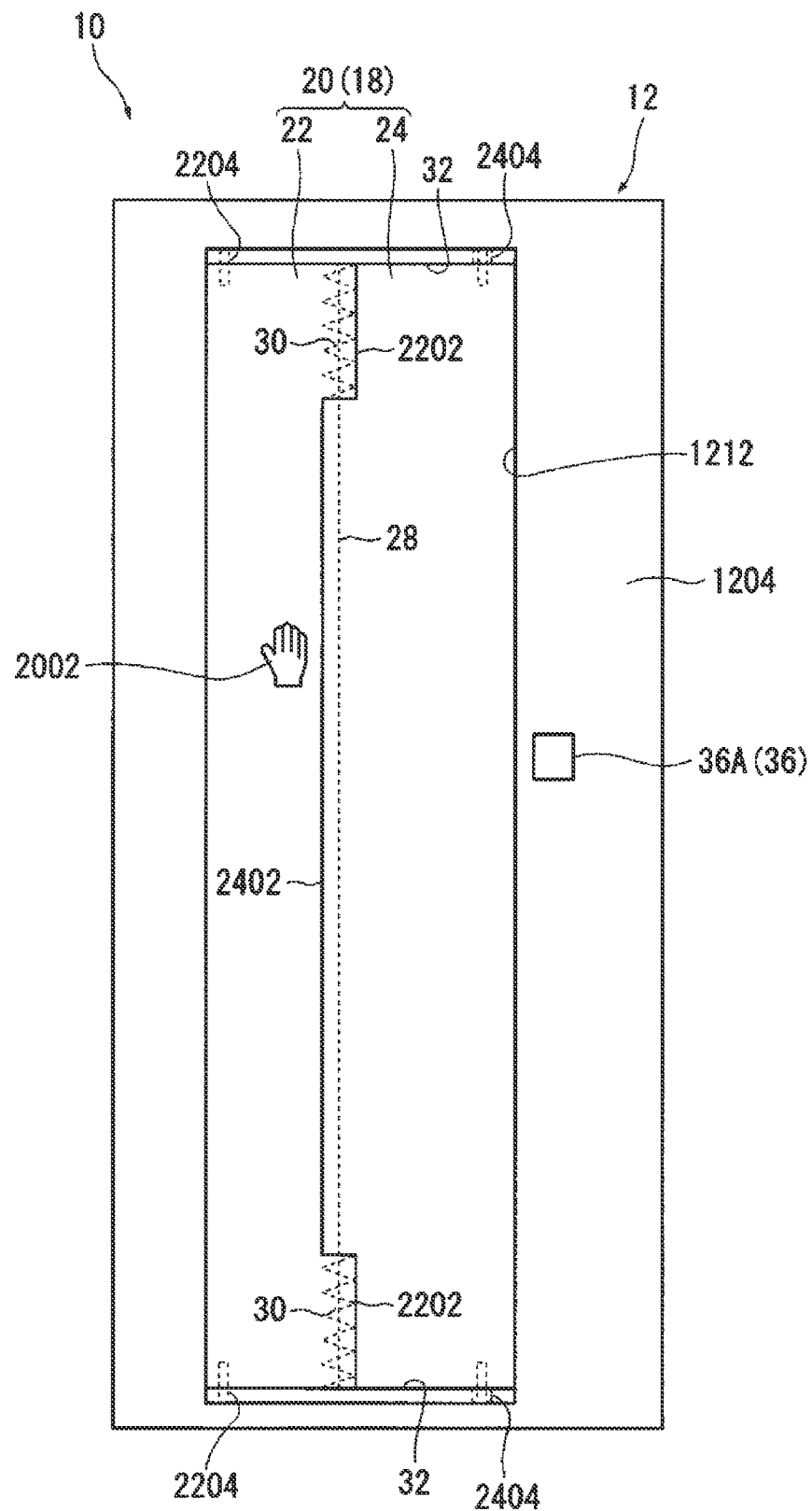
FIG. 2 is a front view of a front wall and a door located at a closed position and closing an entrance as viewed from the outside of the lavatory.
Figure 3:
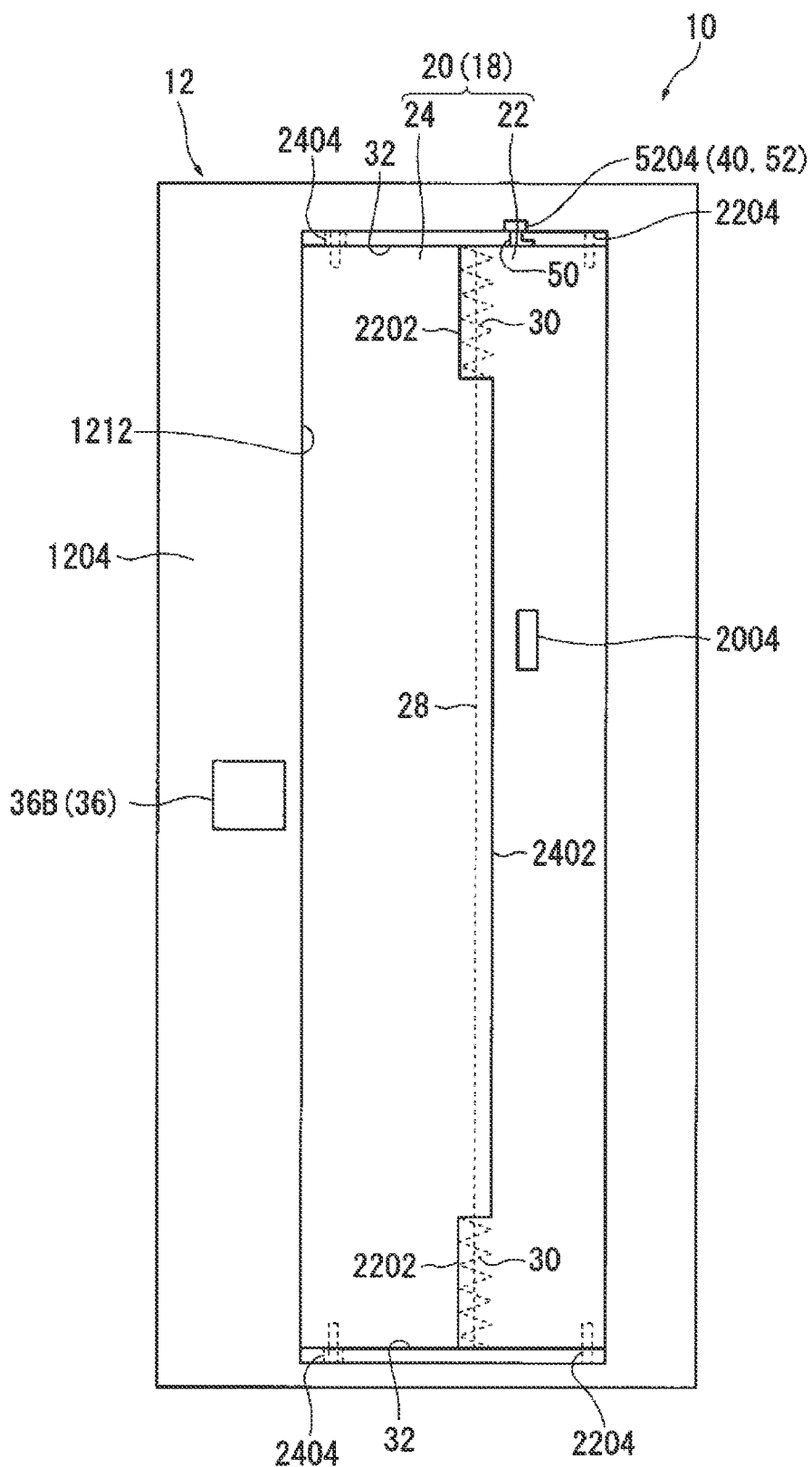
FIG. 3 is a front view of the front wall and the door located at the closed position and closing the entrance as viewed from the inside of the lavatory.
Figure 11:
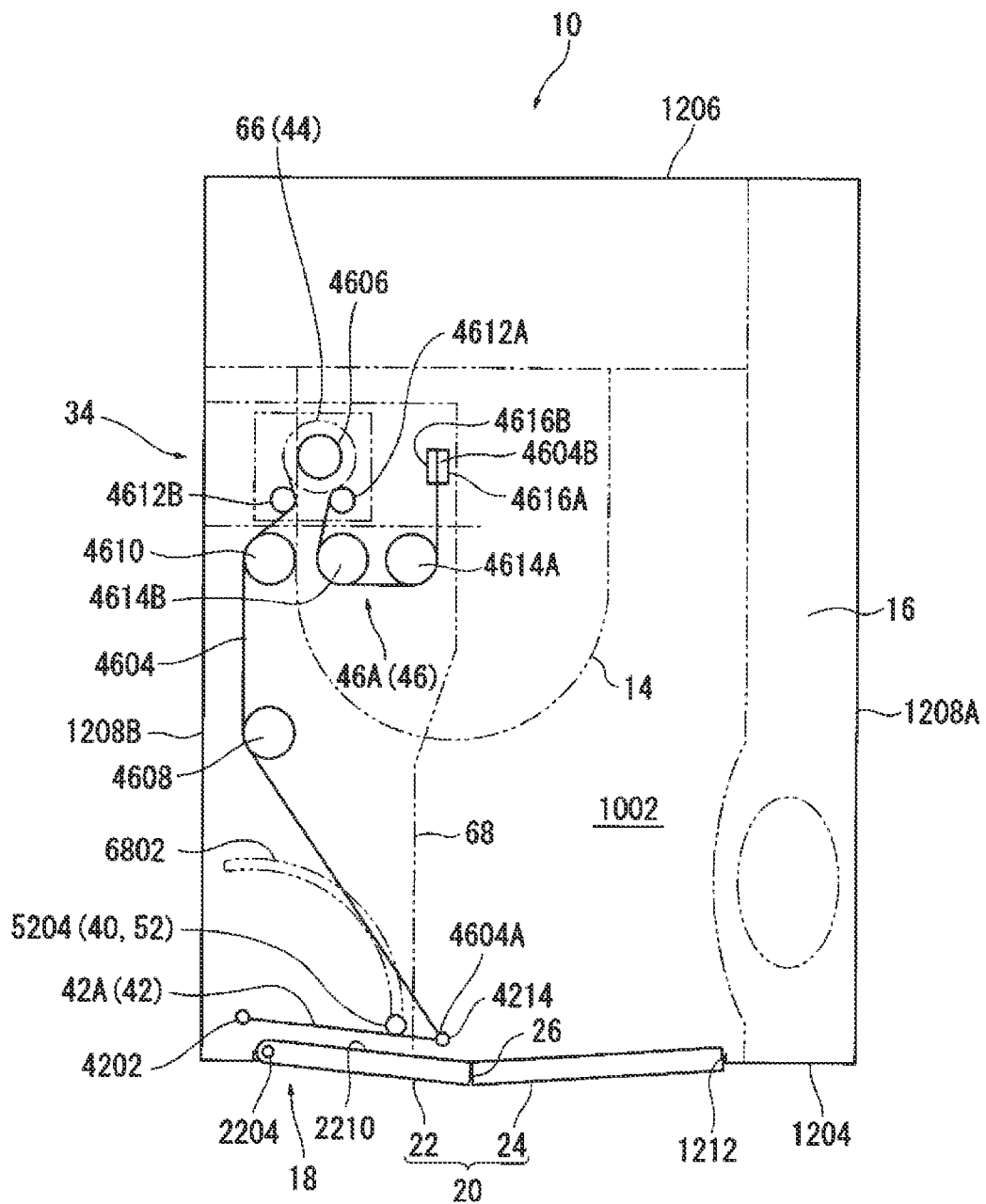
FIG. 11 is a schematic plan view of the powered door opening mechanism including the power transmission mechanism in a state where the door is located at the closed position.
Figure 12:
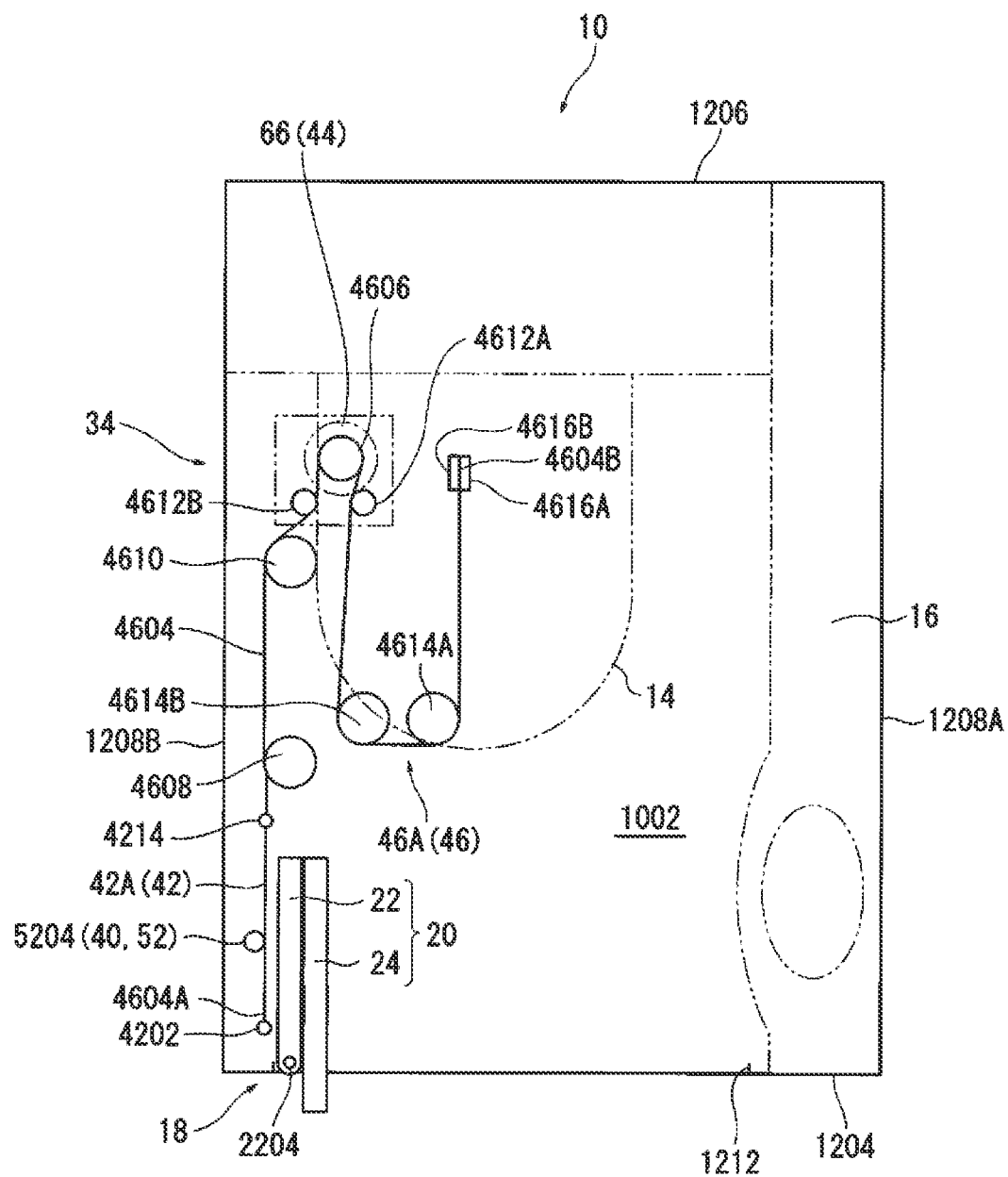
FIG. 12 is a schematic plan view of the powered door opening mechanism including the power transmission mechanism in a state where the door is located at the open position.

In the front wall 1204, an entrance 1212 of the lavatory 1002 is provided on the side relatively closer to the second side wall 1208B as illustrated in FIGS. 11 and 12, and the entrance 1212 is opened and closed with a door opening and closing mechanism 18 as illustrated in FIGS. 2 and 3.

The door opening and closing mechanism 18 includes a door 20 that can manually open and close the entrance 1212. The door 20 is supported in a movable manner between a closed position where the entrance 1212 is closed as illustrated in FIGS. 2, 3, and 11 and an open position where the entrance 1212 is opened as illustrated in FIG. 12, and always biased to be at the closed position.

As illustrated in FIGS. 2 and 3, the door 20 has a width and a height corresponding to the entrance 1212.

The door 20 is a folding-type door composed of two door members, namely a first door member 22 and a second door member 24 that are coupled with each other in a mutually foldable manner.

In the state where the first door member 22 and the second door member 24 are in an unfolded state as illustrated in FIGS. 2, 3, and 11, the door 20 is set to the closed position for closing the entrance 1212, whereas in the state where the first door member 22 and the second door member 24 are folded and overlapped inside the lavatory 1002 as illustrated in FIG. 12, the door 20 is set to the open position for opening the entrance 1212.

As illustrated in FIG. 11, at the closed position of the door 20, a part 26 where the first door member 22 and the second door member 24 are coupled is displaced in the direction away from the lavatory 1002 more than both ends of the door 20 in the width direction in plan view.

This prevents the door 20 from being opened with the first door member 22 and the second door member 24 swung due to the load of acceleration during landing or takeoff of the aircraft, and reliably maintains the closed position of the door 20.

The present technology is naturally applicable to a case where the first door member 22 and the second door member 24 linearly extend at the closed position of the door 20 in plan view.

As illustrated in FIGS. 2 and 3, a first bracket 2202 is provided in a projecting manner at the upper portion and lower portion of the end portion where the first door member 22 faces the second door member 24, and a second bracket 2402, which is inserted between the first brackets 2202 on the upper and lower sides, is provided in a projecting manner at the end portion where the second door member 24 faces the first door member 22.

With the second bracket 2402 inserted between the first brackets 2202 on the upper and lower sides, and a shaft 28 inserted through the first bracket 2202 and the second bracket 2402, the first door member 22 and the second door member 24 are coupled with each other in a foldable manner.

A torsion coil spring 30 is provided from the first bracket 2202 to the second bracket 2402 on the upper and lower sides of the second bracket 2402, and thus the first door member 22 and the second door member 24 are always biased to be located at the closed position.

A light leakage cover not illustrated in the drawing is provided at the end portion where the first door member 22 and the second door member 24 face each other.

As illustrated in FIGS. 2 and 3, shafts 2204 are provided so as to be movable up and down at the upper and lower end surfaces of the end portion of the first door member 22 located opposite the second door member 24, and the shafts 2204 are inserted to holes not illustrated in the drawing of a mounting frame 32 of the front wall 1204 provided at the end portion of the entrance 1212 on the second side wall 1208B side, thus supporting the first door member 22 in a swingable manner around the shaft 2204.

Slide members 2404 are provided at the upper and lower end surfaces of the end portion of the second door member 24 located opposite the first door member 22, and the slide members 2404 are engaged with a guide rail not illustrated in the drawing of the mounting frame 32 of the front wall 1204, such that the slide member 2404 moves along the guide rail during the opening and closing of the entrance 1212.

The pair of shafts 2204 provided in the first door member 22 are always biased with a biasing member not illustrated in the drawing in the insertion direction to the holes of the mounting frame 32.

Further, a pin for detaching operation not illustrated in the drawing that can move the pair of shafts 2204 to the direction opposite to the biasing direction is provided in the pair of shafts 2204 in an operable manner from the outside of the lavatory 1002.

Thus, even when the user of the lavatory 1002 collapses due to poor health or the like inside the lavatory 1002 and the user's body interferes with the door 20 located at the closed position, the user can be rescued by operating the above-described operating pin to detach the pair of shafts 2204 from the holes of the mounting frame 32 and by detaching the slide member 2404 of the second door member 24 from the guide rail so as to detach the first door member 22 and the second door member 24 from the mounting frame 32 of the front wall 1204 from the outside of the lavatory 1002 and open the entrance 1212 of the lavatory 1002.

The reference numeral 2002 in FIG. 2 represents an indicator of pushing the first door member 22 by hand when opening the door 20 from the outside of the lavatory 1002, and the reference numeral 2004 in FIG. 3 represents a knob for grabbing and pulling the door 20 by hand when opening the door 20 from the inside of the lavatory 1002.

A damper not illustrated in the drawing is provided that reduces the impact of closing the entrance 1212 by slowing down the movement when the first door member 22 and the second door member 24 shift from the folded state to the unfolded state, i.e., when the door 20 moves from the open position to the closed position.

A lock mechanism not illustrated in the drawing is provided across the second door member 24 moved to the closed position and the front wall 1204 for the purpose of preventing the door 20 from being opened from the outside when the user is inside the lavatory 1002.

The various publicly known structures may be employed for such a coupling structure and attachment structure of the first door member 22 and the second door member 24, and the present technology is also naturally applicable to a case where the door 20 is composed of a single openable and closable door member.

Figure 5:
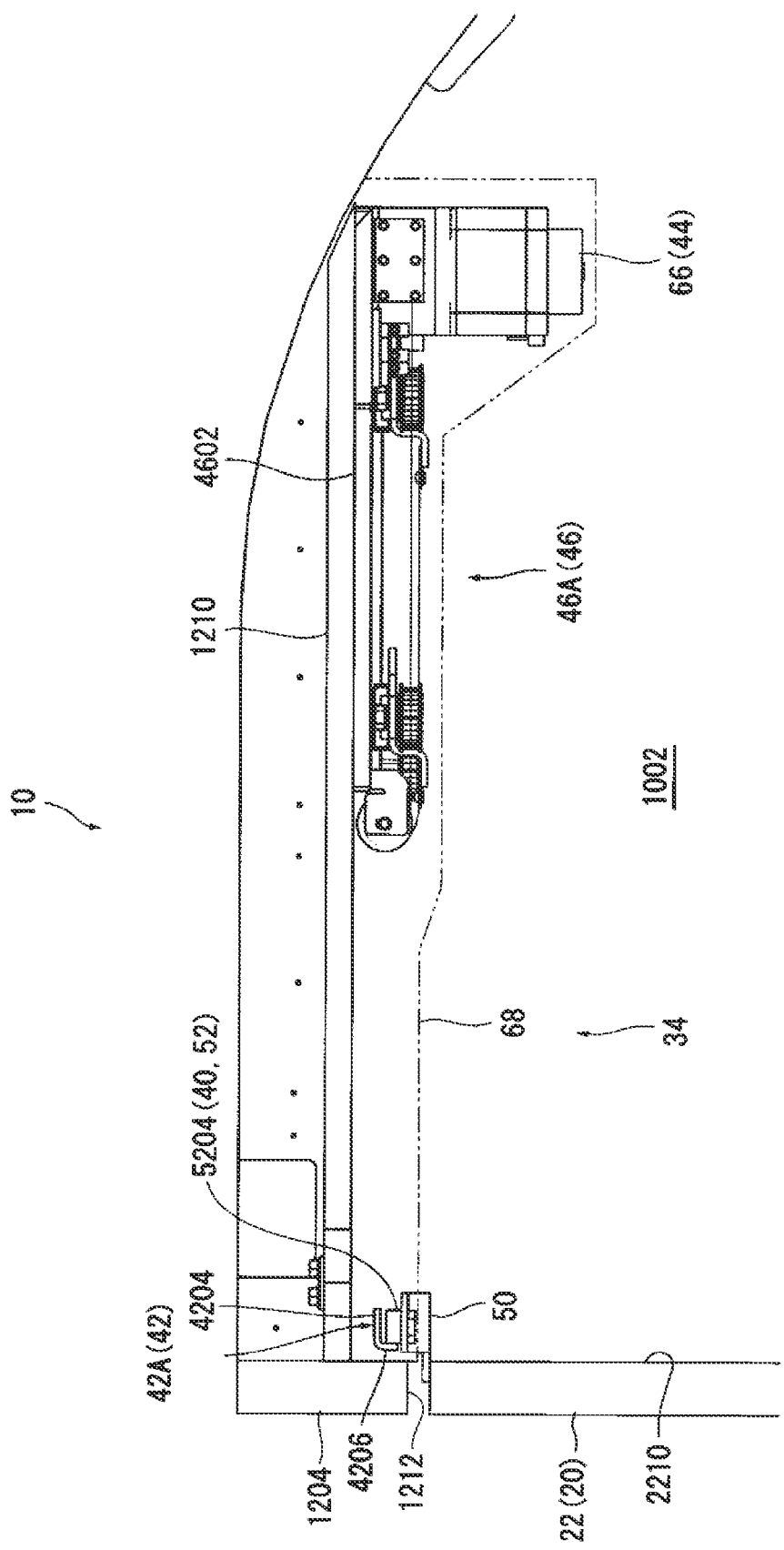
FIG. 5 is a side view of a powered door opening mechanism including a power transmission mechanism in a state where the door is located at the closed position as viewed from the second side wall side inside the lavatory.
Figure 6:
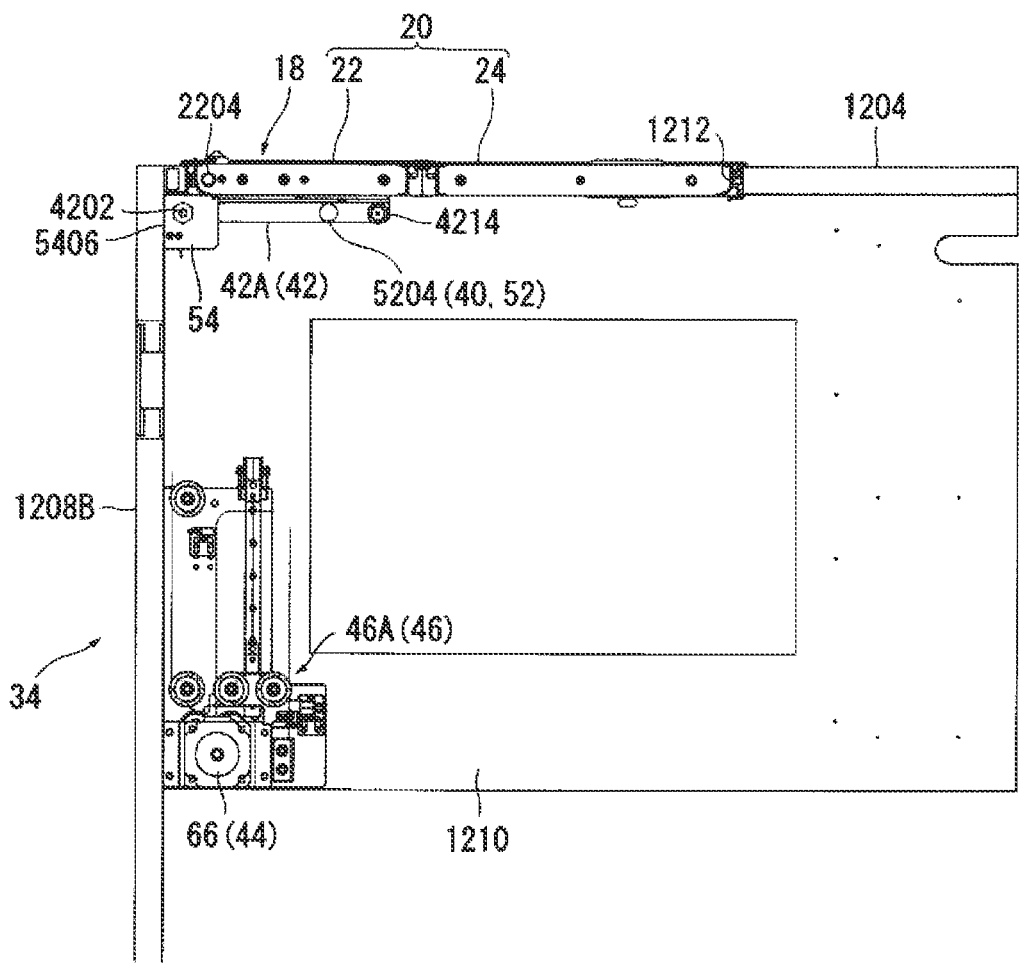
FIG. 6 is a view of the powered door opening mechanism including the power transmission mechanism in a state where the door is located at the closed position as viewed from the lower side inside the lavatory.

As illustrated in FIGS. 5 and 6, the door opening and closing mechanism 18 is provided with a powered door opening mechanism 34 that moves the door 20 from the closed position to the open position.

Figure 17:
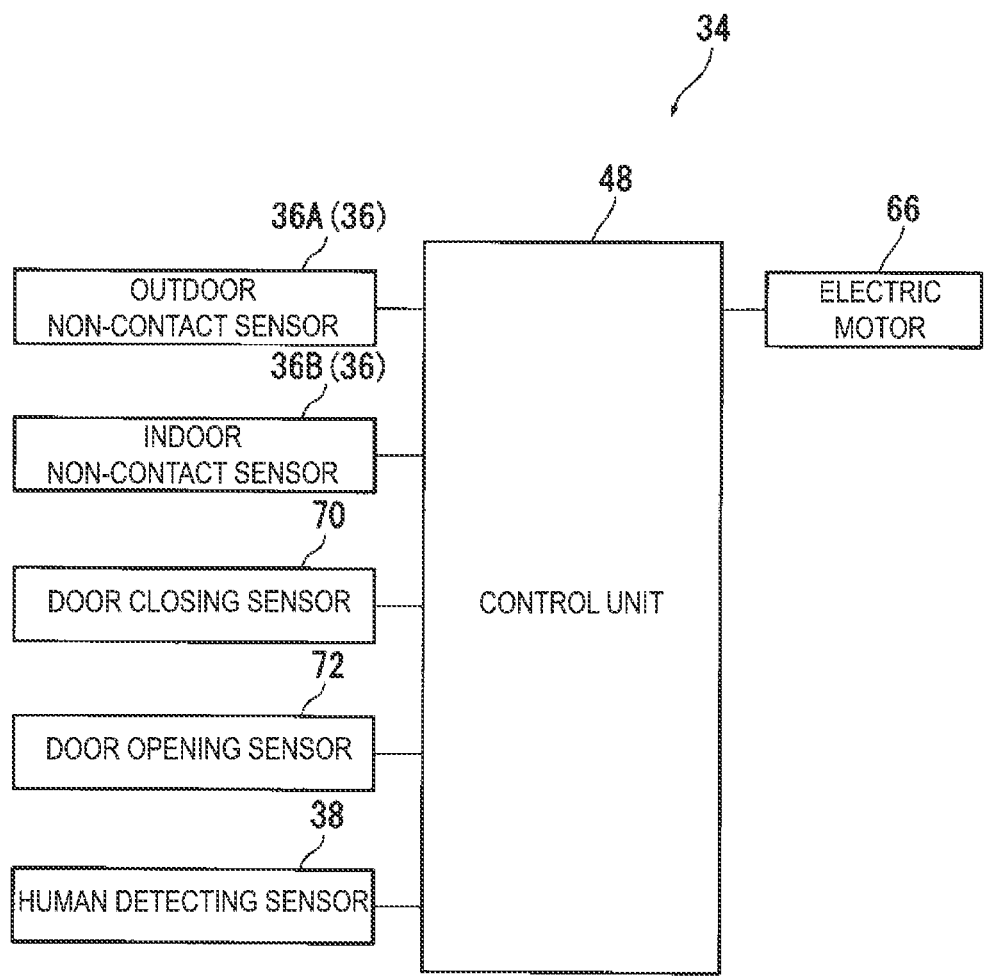
FIG. 17 is a block diagram illustrating a configuration of a control system of the powered door opening mechanism.

The powered door opening mechanism 34 includes a non-contact sensor 36 and a human detecting sensor 38 illustrated in FIG. 17, an engaged member 40, an engaging member 42, an actuator 44, and a power transmission mechanism 46 illustrated in FIGS. 11 and 12, and a control unit 48 illustrated in FIG. 17.

As illustrated in FIGS. 2 and 3, the non-contact sensor 36 is a sensor that detects part of the human body such as a hand, and various publicly known sensors such as an infrared ray sensor may be used as the non-contact sensor 36.

The non-contact sensor 36 is provided outside and inside the lavatory 1002 such that the user of the lavatory 1002 can enter and leave the lavatory 1002 without touching the door 20.

The non-contact sensor 36 is provided at a height where the hand can be easily held at a portion in the front wall 1204 on a lateral side of the second door member 24 outside and inside the lavatory 1002.

In the following description, the non-contact sensor 36 provided outside the lavatory 1002 is referred to as an outdoor non-contact sensor 36A, and the non-contact sensor 36 provided inside the lavatory 1002 is referred to as an indoor non-contact sensor 36B.

The human detecting sensor 38 is a sensor that detects a person inside the lavatory 1002 in a non-contact manner and is provided on a wall surface or the ceiling wall 1210 facing the inside of the lavatory 1002.

As the human detecting sensor 38, various publicly known sensors such as an infrared ray sensor may be used.

As illustrated in FIGS. 3 and 4, the engaged member 40 is provided at the upper end of the door 20 and is disposed at a location on the upper side of the door 20 and on the inner surface side of the door 20 located inside the lavatory 1002.

In the present embodiment, the engaged member 40 is composed of a roller 5204 supported by a bracket 50.

Figure 4A:
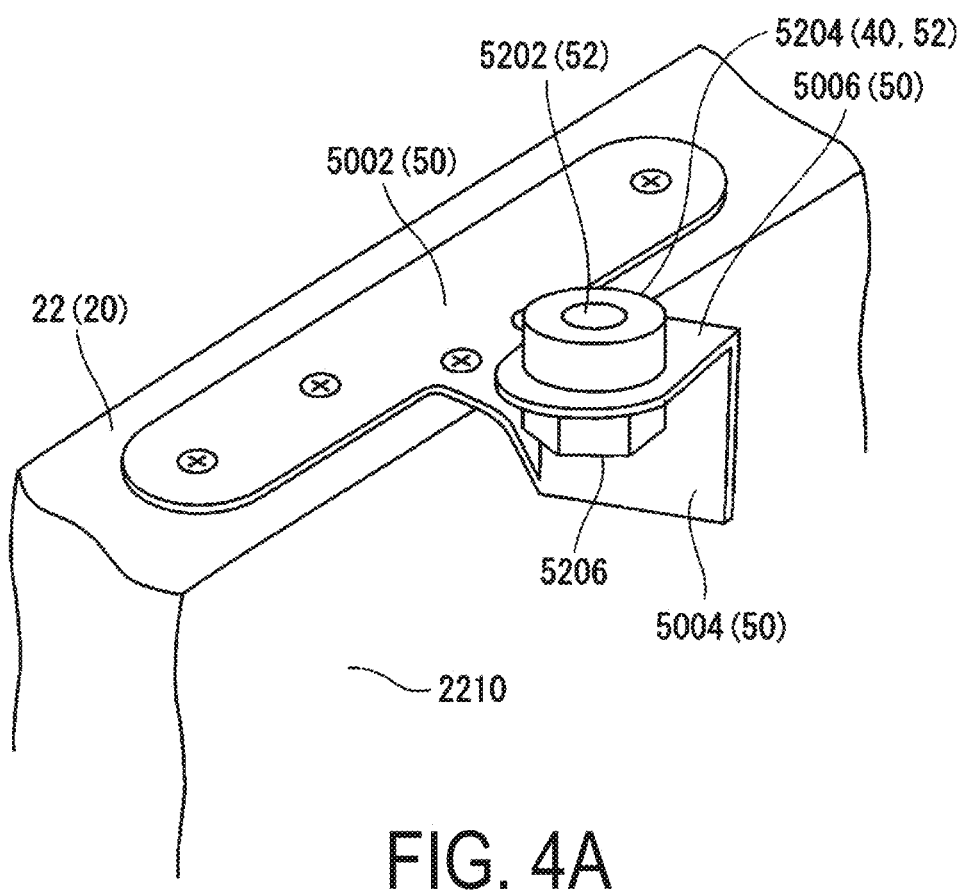
FIGS. 4A-4B provide an explanatory diagram of an attaching state of a bracket and a roller serving as an engaged member to a first door member, where
Figure 4B:
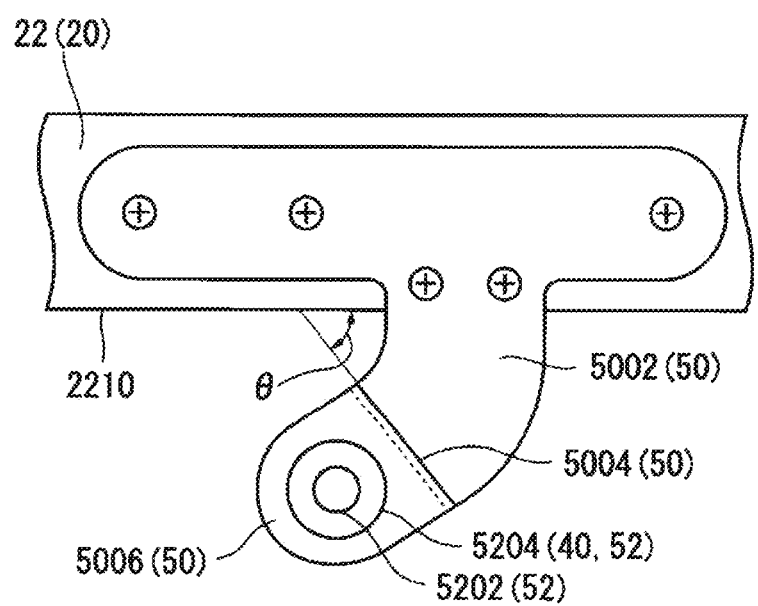

As illustrated in FIGS. 4A-4B, the bracket 50 is attached to the upper end surface of the first door member 22 in a middle portion in the width direction.

The bracket 50 is composed of a sheet metal, and includes a base plate part 5002 attached with a screw to the upper end surface of the first door member 22 and protruded more to the inner side of the lavatory 1002 than an inner surface 2210 of the first door member 22, an upright plate part 5004 protruded from the tip of the base plate part 5002 more to the upper side than the first door member 22, and a mounting plate part 5006 horizontally bent from the upper end of the upright plate part 5004.

A cam follower 52 is attached to the mounting plate part 5006.

The cam follower 52 includes a support shaft 5202 and the roller 5204 rotatably supported by the support shaft 5202. The support shaft 5202 is inserted to a hole not illustrated in the drawing of the mounting plate part 5006, and the support shaft 5202 is threadedly engaged with a nut 5206 at the bottom surface of the mounting plate part 5006, and thus, the roller 5204 is rotatably disposed on the mounting plate part 5006.

As illustrated in FIG. 11, the roller 5204 is disposed at a location more on the inner side of the lavatory 1002 than the inner surface 2210 of the first door member 22 and more on the upper side than the first door member 22 as illustrated in FIG. 5.

An engaged plate part protruded to the upper side from the mounting plate part 5006 of the bracket 50 may be provided so as to make up the engaged member 40 with the engaged plate part, but the roller 5204 composed of the engaged member 40 is advantageous in smoothing the engagement with the engaging member 42 described later.

As illustrated in FIG. 5, the engaging member 42, provided inside the lavatory 1002 at a location more on the upper side than the door 20, has a shape that opens in the direction away from the first door member 22 and is engageable with the roller 5204 from the first door member 22 side from the closed position of the door 20 to the open position of the door 20.

The engaging member 42 is provided in the above-described manner, and therefore when the door 20 is manually opened, the roller 5204 provided at the first door member 22 to move together with the first door member 22 moves in the direction away from the entrance 1212 without interfering with the engaging member 42, and thus, the operation of manually moving the door 20 from the closed position to the open position is smoothly performed even with the powered door opening mechanism 34.

Figure 8:
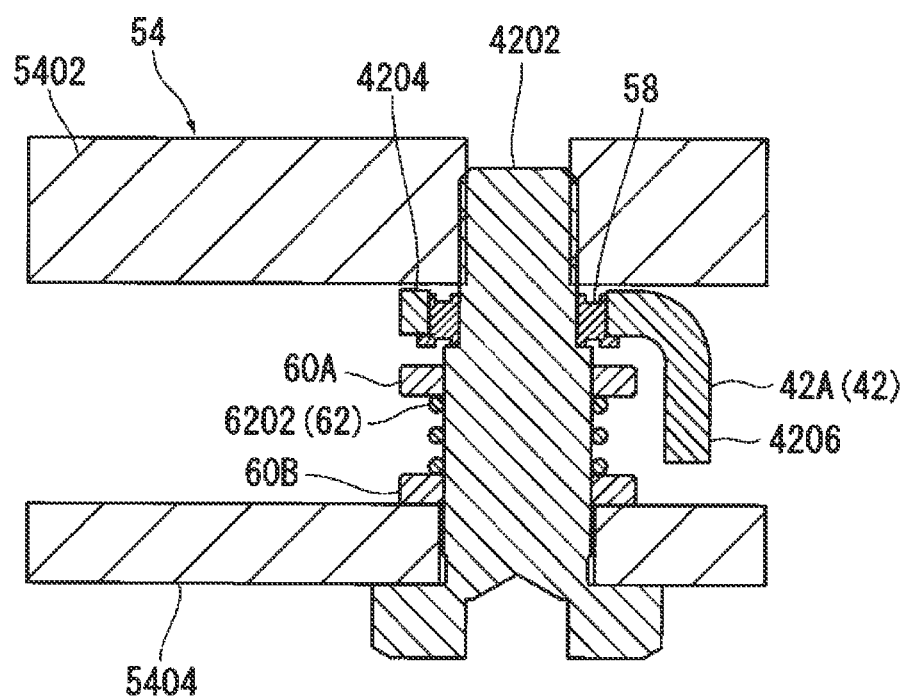
FIG. 8 is a sectional view of a state where the arm making up the engaging member is rotatably attached to an arm support shaft.

As illustrated in FIGS. 6 to 8, in the present embodiment, the engaging member 42 is composed of an arm 42A that is swingable in the direction toward and away from the entrance 1212 in the horizontal direction with an arm support shaft 4202, the axial center of which is aligned with the up-down direction, as a fulcrum.

As illustrated in FIG. 6, the arm 42A has substantially the same length as the width of the first door member 22, and the base end, which is one end portion of the arm 42A in the longitudinal direction, is swingably supported at the ceiling wall 1210 through the arm support shaft 4202. The arm support shaft 4202 is disposed at a location relatively closer to a support shaft 2204 of the first door member 22 and relatively closer to the second side wall 1208B.

Figure 9:
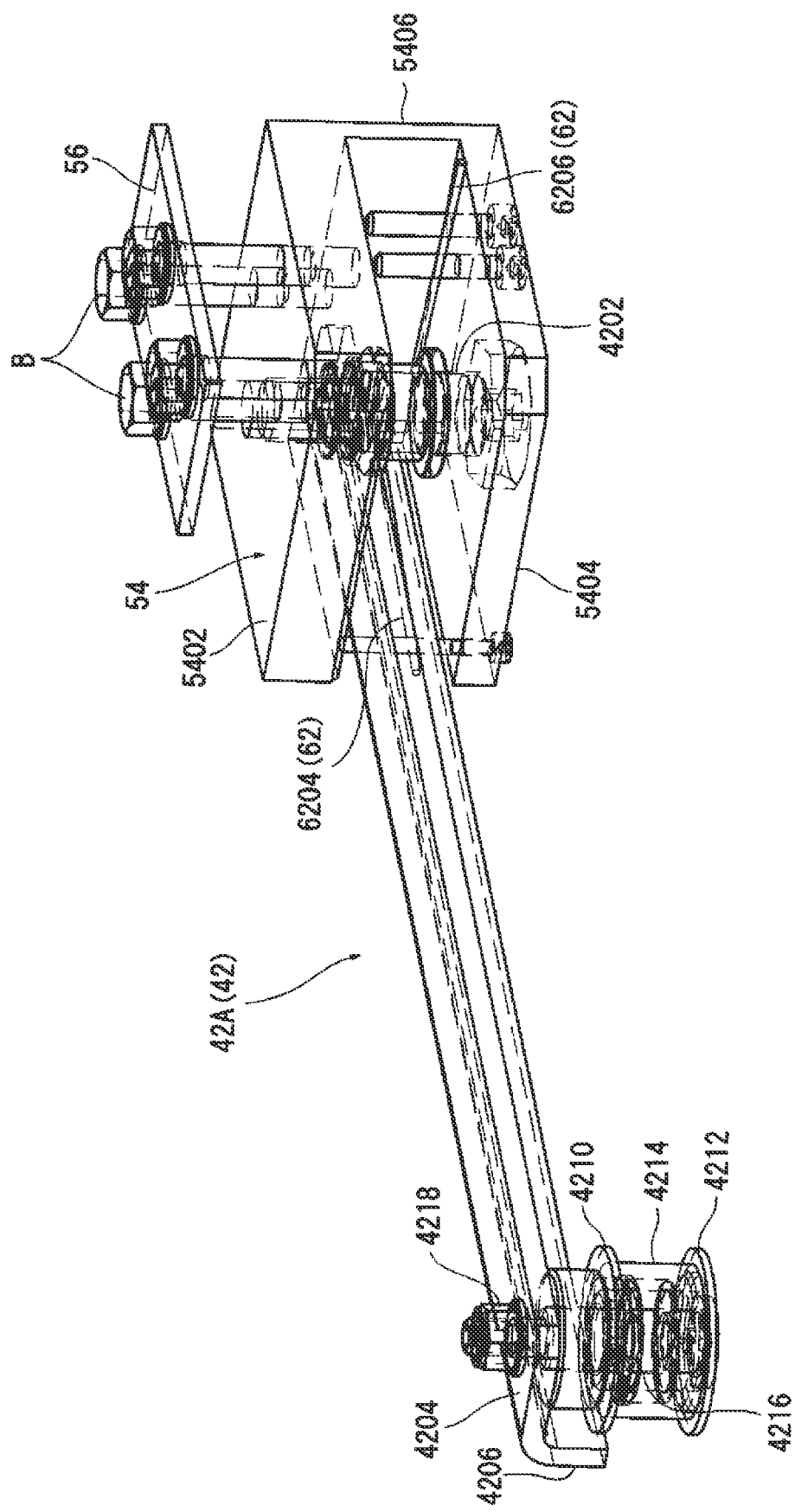
FIG. 9 is a perspective view of an attaching state of the arm making up the engaging member.

The arm 42A is composed of a sheet metal, and includes a body plate part 4204 having a uniform width and extending in parallel with the floor board 1202, and a bent plate part 4206 bent downward from one end of the body plate part 4204 in the width direction and extended along the body plate part 4204 as illustrated in FIGS. 5 and 9.

At the closed position of the door 20, the arm 42A is set to the initial position where it extends substantially parallel to the first door member 22 as illustrated in FIGS. 6 and 11, whereas at the open position of the door 20, the arm 42A is set to the open position where it extends in parallel with the first door member 22 as illustrated in FIG. 12.

As illustrated in FIG. 5, at the initial position of the arm 42A, the bent plate part 4206 is disposed between the inner surface 2210 of the first door member 22 and the roller 5204 in plan view, and in the present example, the bent plate part 4206 is disposed in contact with the roller 5204 from the first door member 22 side, or disposed at a position near the roller 5204.

As illustrated in FIGS. 6, 7A and 9, a roller 4214 sandwiched by a first collar 4210 and a second collar 4212 is rotatably provided through a support shaft 4216 and a nut 4218 at the tip of the bottom surface of the body plate part 4204 that is the other end portion of the arm 42A in the longitudinal direction.

As illustrated in FIG. 7B, one end portion, in the longitudinal direction, of a belt 4604 making up a belt and pulley mechanism 46A described later is attached to the roller 4214 with a pair of mounting pieces 4220 and 4222, and thus one end portion of the belt 4604 in the longitudinal direction is rotatably attached to the end of the arm 42A through the roller 4214.

As illustrated in FIG. 7A, the arm support shaft 4202 is supported through an arm bracket 54, and the arm bracket 54 is attached to the ceiling wall 1210 through a pressing plate 56 and a plurality of bolts B.

The arm bracket 54 is made of metal and includes an upper plate part 5402 and a lower plate part 5404 facing each other, and a side plate part 5406 coupling the upper plate part 5402 and the lower plate part 5404. It is optional, for example, to provide the arm bracket 54 integrally with a support frame 4602 described later.

The ceiling wall 1210 is sandwiched by the pressing plate 56 and the upper plate part 5402 with the plurality of bolts B, such that the arm bracket 54 is attached to the ceiling wall 1210, and that the side plate part 5406 is in contact with the second side wall 1208B as illustrated in FIGS. 6 and 7. Thus, the arm 42A is swingably supported by the ceiling wall 1210 through the arm support shaft 4202 and the arm bracket 54.

As illustrated in FIG. 8, the arm support shaft 4202 is composed of a square hole bolt, and is inserted to the bolt insertion hole of the lower plate part 5404 from the lower side of the lower plate part 5404 such that its tip male screw is coupled with the female screw of the upper plate part 5402, and that the arm support shaft 4202 is attached to the arm bracket 54.

The base end of the body plate part 4204 of the arm 42A in the longitudinal direction is rotatably supported by the arm support shaft 4202 through a bearing 58 at a portion of the arm support shaft 4202 relatively closer to the upper plate part 5402 between the upper plate part 5402 and the lower 20 plate part 5404.

A coil part 6202 of a torsion coil spring 62 is wound around a portion of the arm support shaft 4202 more on the lower side than the bearing 58, through upper and lower washers 60A and 60B.

Figure 10:
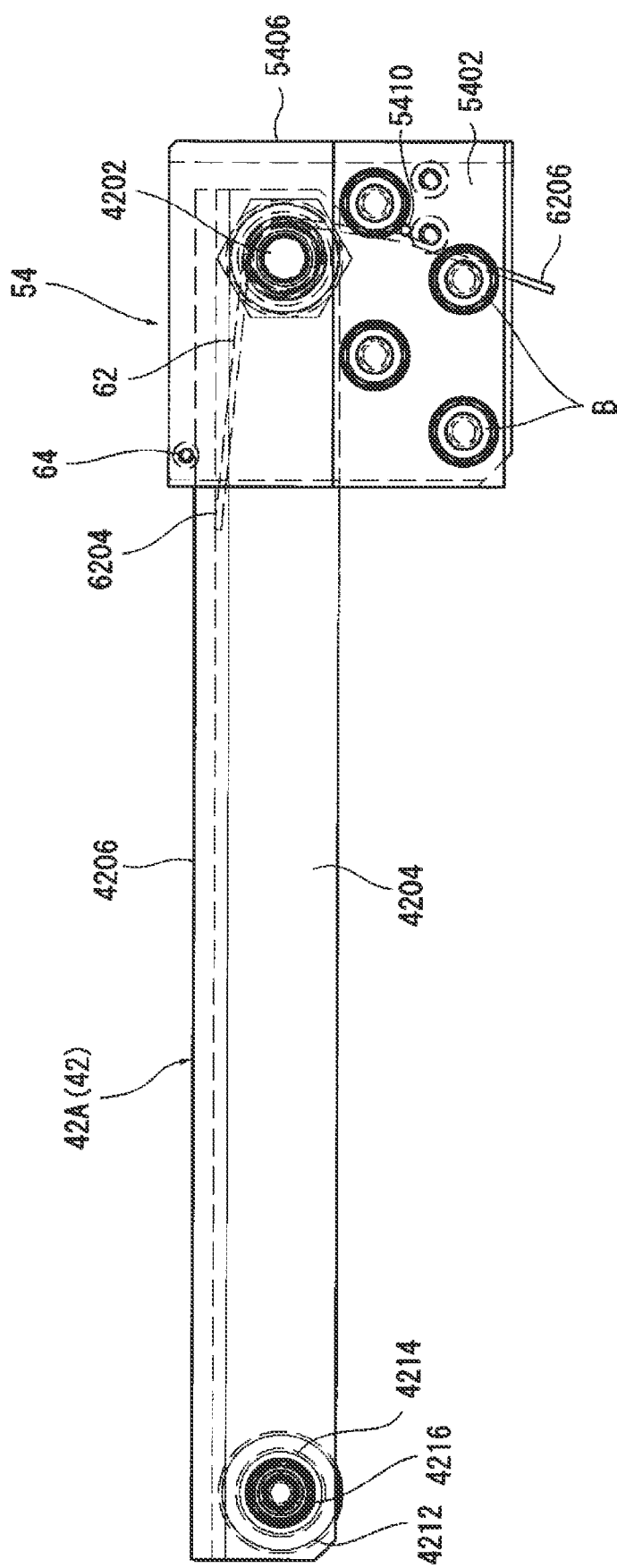
FIG. 10 is a plan view of an attaching state of the arm making up the engaging member.

Of a pair of leg parts 6204 and 6206 protruded from both ends of the coil part 6202, the leg part 6204 is in contact with the bent plate part 4206 as illustrated in FIGS. 7A-7B, whereas the other leg part 6206 is in contact with a pin 5410 provided in the lower plate part 5404 as illustrated in FIG. 10 so as to bias the arm 42A such that the arm 42A is always located at the initial position.

The reference numeral 64 in FIG. 10 represents an initial position 30 stopper that is provided in the lower plate part 5404 of the bracket 50 to set the initial position of the arm 42A by making contact with the bent plate part 4206.

Thus, when the arm 42A is swung by the powered door opening mechanism 34 from the closed position to the open position at the closed position of the door 20, the bent plate part 4206 swings the first door member 22 through the roller 5204 and the door 20 is set to the open position illustrated in FIG. 12.

When the open position of the arm 42A is released, the arm 42A and the first door member 22 swing with the biasing force of the torsion coil spring 30 provided in the door 20 and the torsion coil spring 62 wound around the arm support shaft 4202 such that the arm 42A returns to the initial position and that the door 20 returns to the closed position as illustrated in FIG. 11.

In the present embodiment as illustrated in FIGS. 5, 6, and 11 to 16, the actuator 44 is an electric motor 66 (stepper motor), and the power transmission mechanism 46 includes the belt and pulley mechanism 46A.

In FIGS. 5, 6, 7A, 14, 15 and 16, the belt 4604 is omitted for the sake of clear illustration of the belt and pulley mechanism 46A.

Figure 14:
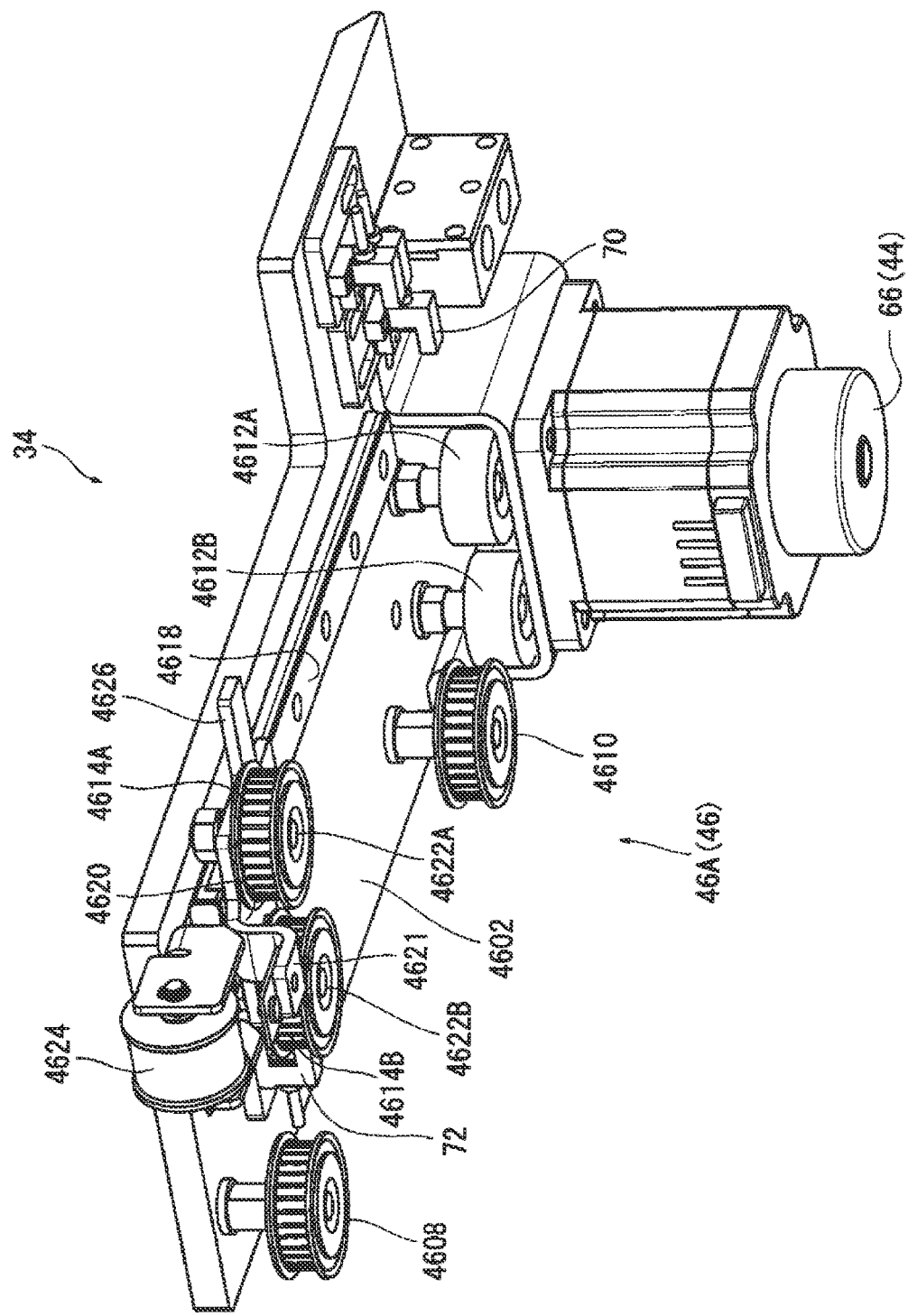
FIG. 14 is a perspective view of the powered door opening mechanism including the power transmission mechanism.

The belt and pulley mechanism 46A is provided inside the lavatory 1002 at a location more on the upper side than the door 20, and the belt and pulley mechanism 46A and the electric motor 66 are disposed on the side relatively closer to the ceiling wall 1210 as illustrated in FIGS. 5 and 6 and attached to the ceiling wall 1210 through the single support frame 4602 illustrated in FIG. 14.

Figure 13:
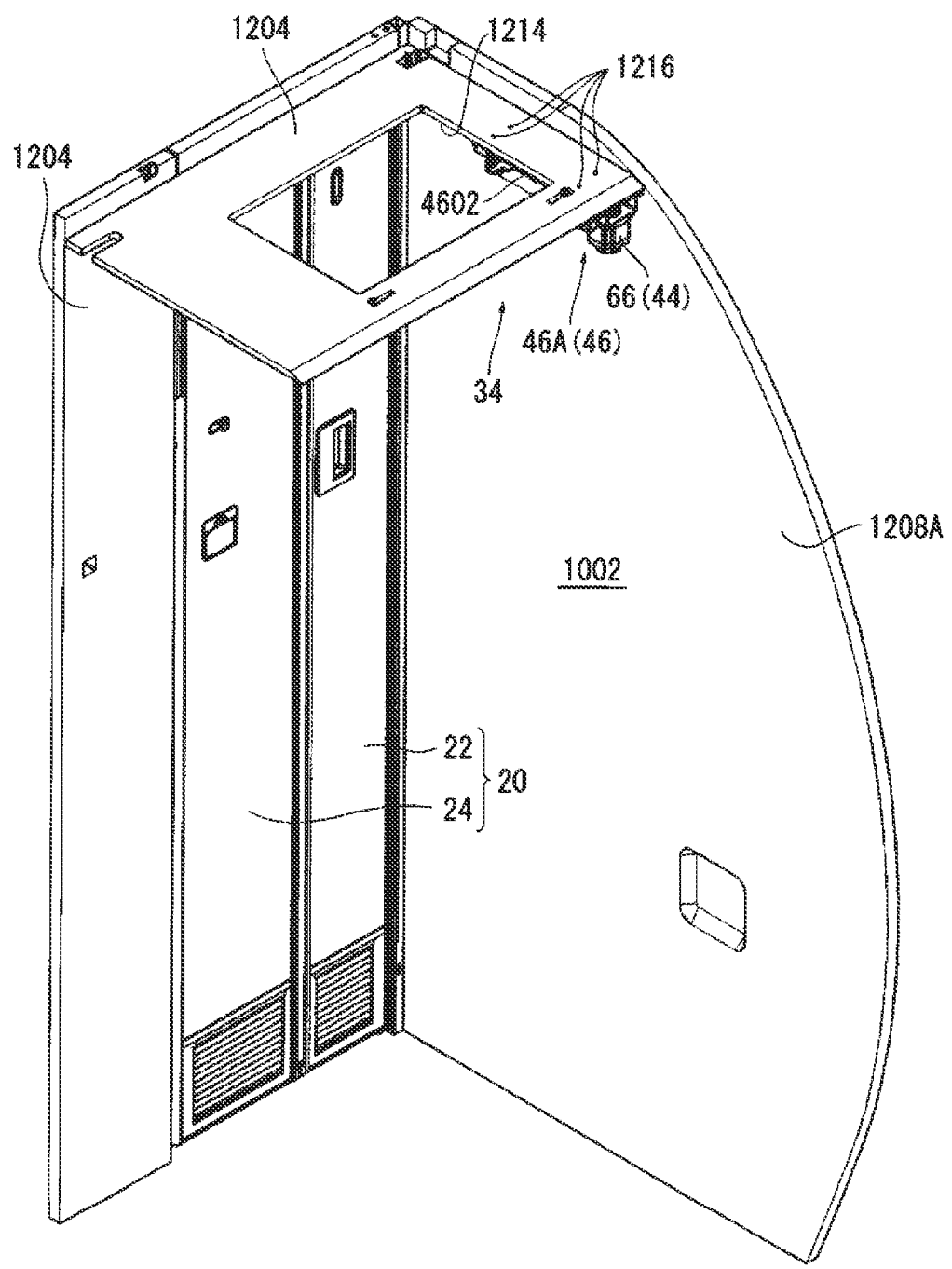
FIG. 13 is a perspective view of a front wall where the entrance of the aircraft lavatory unit is closed by the door, a ceiling wall where the powered door opening mechanism is attached, and a second side wall connecting the front wall and the ceiling wall.
Figure 16:
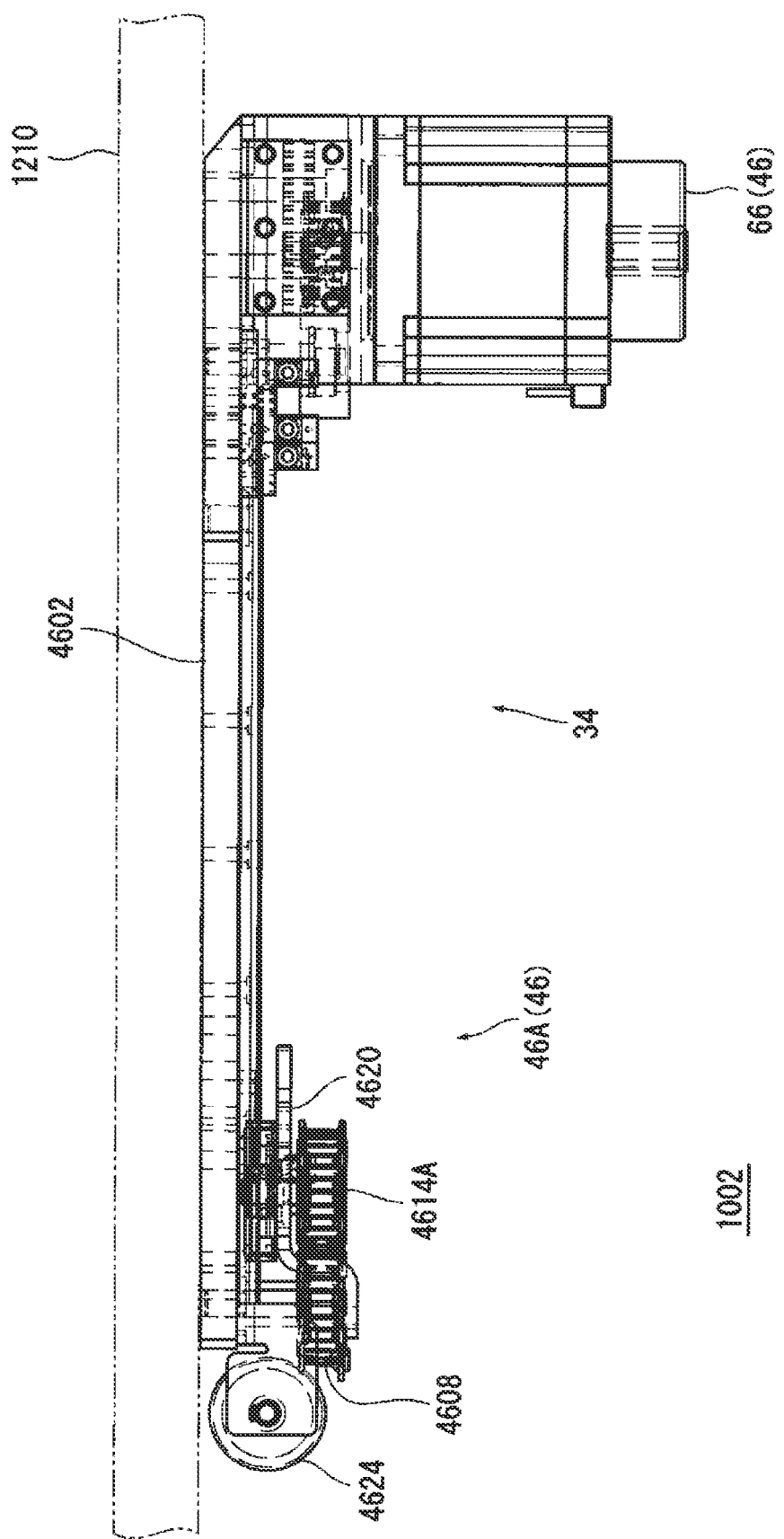
FIG. 16 is a side view of the powered door opening mechanism including the power transmission mechanism.

The support frame 4602 is composed of a metal plate and attached to the bottom surface of the ceiling wall 1210 at a position relatively closer to the second side wall 1208B as illustrated in FIGS. 13 and 16, and the support frame 4602 has an elongated shape in the direction connecting the front wall 1204 and the rear wall 1206, i.e., the front-rear direction of the lavatory 1002.

The reference numeral 1214 in FIG. 13 represents an opening provided in the ceiling wall 1210 and configured to dispose a lighting fixture, and the reference numeral 1216 represents an end portion of a bolt that couples the support frame 4602 and the ceiling wall 1210.

As illustrated in FIGS. 5 and 6, the electric motor 66 is provided at a location relatively closer to the second side wall 1208B at the end portion of the support frame 4602 on the rear wall 1206 side in the longitudinal direction.

As illustrated in FIGS. 11, 12, 14 and 15, the belt and pulley mechanism 46A includes the belt 4604, a toothed driving pulley 4606, a toothed first guide pulley 4608, a toothed second guide pulley 4610, a pair of rollers 4612A and 4612B, and a pair of toothed moving pulleys 4614A and 4614B.

The axial centers of the toothed driving pulley 4606, the toothed first guide pulley 4608, the toothed second guide pulley 4610, the pair of rollers 4612A and 4612B, and the pair of toothed moving pulleys 4614A and 4614B are aligned with the up-down direction, i.e., extended in the up-down direction, thus achieving reduction in size of the belt and pulley mechanism 46A in the up-down direction, i.e., reduction in size of the power transmission mechanism 46 in the up-down direction.

A toothless belt as the belt 4604 and a toothless pulley as the pulley may be used, but for the purpose of more accurately swing the arm 42A, the present embodiment uses a toothed belt provided with teeth as the belt 4604, and uses the toothed driving pulley 4606, the toothed first guide pulley 4608, the toothed second guide pulley 4610, and the pair of toothed moving pulleys 4614A and 4614B provided with teeth as the pulleys.

One end portion 4604A of the belt 4604 in the longitudinal direction is rotatably attached at the end of the arm 42A in the longitudinal direction through the pair of mounting pieces 4220 and 4222 as described above with reference to FIG. 7B.

Figure 15:
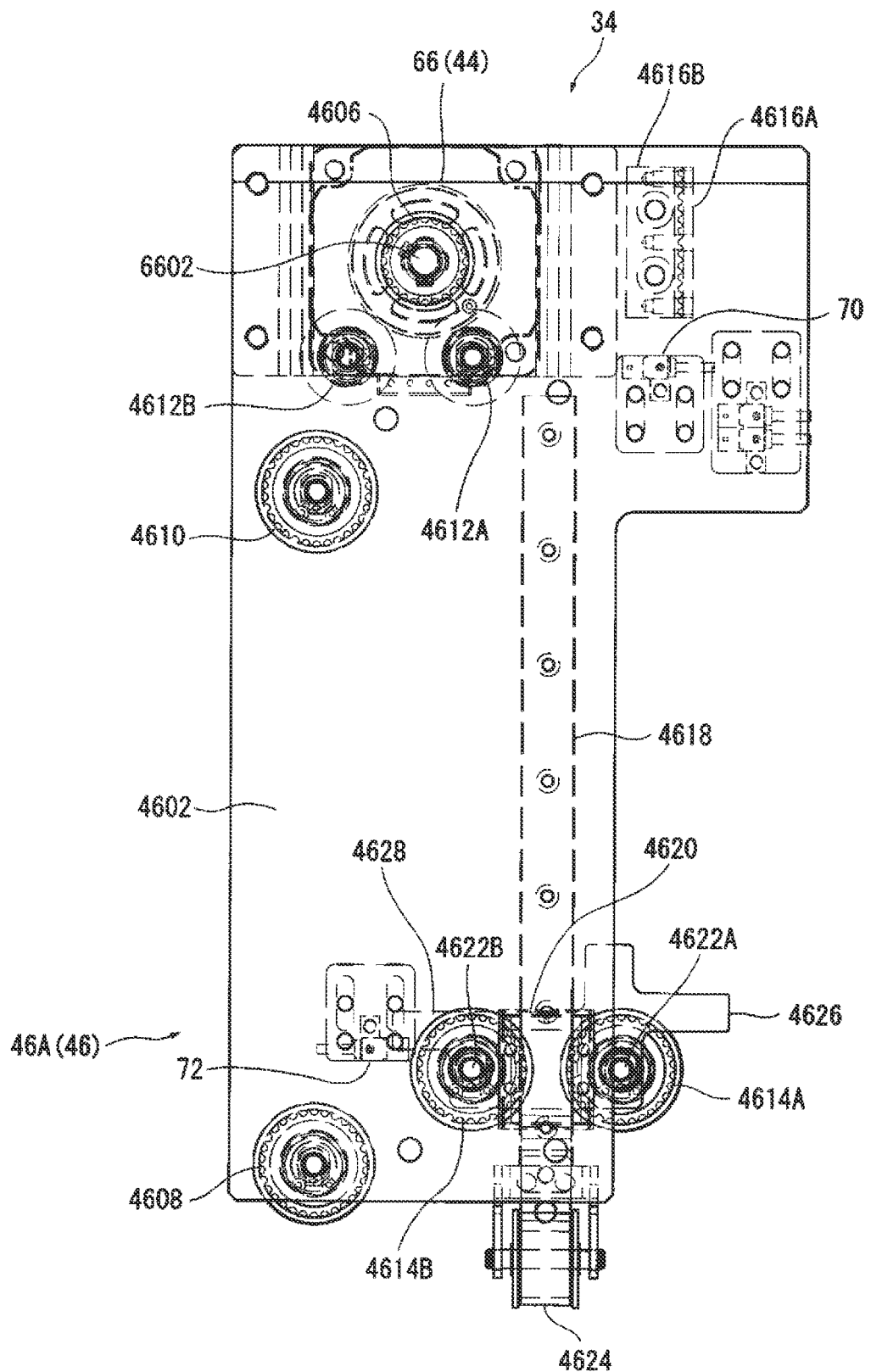
FIG. 15 is a plan view of the powered door opening mechanism including the power transmission mechanism.

As illustrated in FIGS. 11, 12, and 15, the other end portion 4604B of the belt 4604 in the longitudinal direction is sandwiched and fixed by a pair of mounting pieces 4616A and 4616B on the support frame 4602.

As illustrated in FIG. 15, the toothed driving pulley 4606 is attached to an output shaft 6602 of the electric motor 66, and the output shaft 6602 extends in the up-down direction.

As illustrated in FIGS. 14 and 15, a rail 4618 linearly extending in the front-rear direction of the lavatory 1002 is attached to the support frame 4602, and a moving bracket 4620 is provided in a movable manner along the rail 4618.

The pair of toothed moving pulleys 4614A and 4614B is rotatably supported by shafts 4622A and 4622B attached to the moving bracket 4620, and thus the pair of toothed moving pulleys 4614A and 4614B can integrally move back and forth straight along the rail 4618.

In the present embodiment, the moving bracket 4620 can move back and forth straight between the rear end position where the pair of toothed moving pulleys 4614A and 4614B is farthest away from the entrance 1212 as illustrated in FIG. 11, and the front end position where the pair of toothed moving pulleys 4614A and 4614B is closest to the entrance 1212 as illustrated in FIGS. 12, 14, 15 and 16.

As illustrated in FIGS. 14 to 16, a constant load mainspring 4624 is provided at the end portion of the support frame 4602 relatively closer to the front wall 1204 in the longitudinal direction, and the end portion of the constant load mainspring 4624 is attached at a mounting piece 4621 of the moving bracket 4620 so as to bias the moving bracket 4620 such that the moving bracket 4620 is always located at the front end position, and, the constant load mainspring 4624 always applies a tensile force to the belt 4604 such that the belt 4604 does not deflect.

As illustrated in FIGS. 12 and 14, the toothed first guide pulley 4608 is disposed at a location in the support frame 4602 close to the second side wall 1208B, and close to the roller 4214 of the end of the arm 42A at the open position of the arm 42A.

The toothed second guide pulley 4610 is disposed at a location in the support frame 4602 close to the pair of rollers 4612A and 4612B, and close to the second side wall 1208B.

As illustrated in FIGS. 11 and 12, the belt 4604 the other end portion 4604B of which is sandwiched and fixed with the pair of mounting pieces 4616A and 4616B on the support frame 4602 is hung at the pair of toothed moving pulleys 4614A and 4614B, then wound halfway or more around the toothed driving pulley 4606 through the pair of rollers 4612A and 4612B, and then hung at the toothed second guide pulley 4610 and the toothed first guide pulley 4608, such that one end portion 4604A of the belt 46 is attached at the end of the arm 42A through the pair of mounting pieces 4220 and 4222 as illustrated in FIG. 7B.

The power transmission mechanism 46 including the belt and pulley mechanism 46A and the actuator 44 composed of the electric motor 66 are attached to the ceiling wall 1210 relatively closer to the second side wall 1208B through the support frame 4602, and the power transmission mechanism 46 and the actuator 44 are disposed on the side relatively closer to the second side wall 1208B, and, the powered door opening mechanism 34 except for the electric motor 66 is disposed at a location on the upper side of the door 20 as illustrated in FIG. 5.

As illustrated in FIG. 11, at the closed position of the door 20, the arm 42A is set to the initial position, and the pair of toothed moving pulleys 4614A and 4614B is located at the rear end position.

When the electric motor 66 is rotated forward at the closed position of the door 20, the belt 4604 attached at the end of the arm 42A is pulled to the direction of the rear wall 1206, which is the direction away from the entrance 1212 along with the forward rotation of the toothed driving pulley 4606, and the arm 42A moves from the initial position to the open position.

Then, when the pair of toothed moving pulleys 4614A and 4614B move from the rear end position to the front end position with the biasing force of the constant load mainspring 4624, the belt 4604 does not deflect between the toothed driving pulley 4606 and the other end portion 4604B of the belt 4604 the other end portion 4604B of which is fixed by the pair of mounting pieces 4220 and 4222 on the support frame 4602, and the arm 42A is shifted from the initial position to the open position illustrated in FIG. 12 in the state where a tensile force is always applied to the belt 4604 between the other end portion 4604B of the belt 4604 and the toothed driving pulley 4606, thus setting the door 20 to the open position.

In this manner, the belt 4604 attached at the end of the arm 42A is pulled to the direction of the rear wall 1206 with the stroke more than double the movement stroke of the pair of toothed moving pulleys 4614A and 4614B, and the door 20 is shifted from the closed position to the open position.

While the pair of toothed moving pulleys 4614A and 4614B is provided as the toothed moving pulley in the above-described embodiment, the number of toothed moving pulley may be one, or three or more.

As illustrated in FIG. 12, when the electric motor 66 is reversed at the open position of the door 20, the belt 4604 is fed to the arm 42A side along with the reverse rotation of the toothed driving pulley 4606.

In this case, the pair of toothed moving pulleys 4614A and 4614B moves from the front end position to the rear end position against the biasing force of the constant load mainspring 4624, and thus the belt 4604 does not deflect between the other end portion 4604B of the belt 4604 and the toothed driving pulley 4606.

On the other hand, the door 20 is biased by the torsion coil spring 30 provided in the door 20 to move to the closed position, and the arm 42A is biased by the torsion coil spring 62 provided in the arm 42A to return to the initial position.

However, if the feeding amount of the belt 4604 to the end of the arm 42A is small, the movement of the arm 42A to the initial position is constrained by the belt 4604.

This engages the roller 5204 making up the engaged member 40 with the bent plate part 4206 of the arm 42A making up the engaging member 42, and thus the movement of the door 20 to the closed position is constrained.

Specifically, since the movement of the arm 42A to the initial position and the movement of the door 20 to the closed position are constrained by the feeding amount of the belt 4604 to the end of the arm 42A, the door 20 swings in accordance with the feeding amount of the belt 4604 due to the reverse rotation of the toothed driving pulley 4606 against the biasing force of the torsion coil spring 30 provided in the door 20 and the torsion coil spring 62 provided in the arm 42A, and is thus noiselessly and quietly set to the closed position.

Thus, the belt 4604 is fed to the arm 42A with the stroke more than double the movement stroke of the pair of toothed moving pulleys 4614A and 4614B, and the door 20 is shifted from the open position to the closed position.

Specifically, with the stroke more than double the movement stroke of the pair of toothed moving pulleys 4614A and 4614B, the belt 4604 coupled with the arm 42A is pulled to the direction of the rear wall 1206 and fed to the direction of the entrance 1212, thus achieving the power transmission mechanism 46 with a compact structure that takes up little space in the front-rear direction of the lavatory 1002.

The door 20 is biased to move to the closed position with the biasing force of the torsion coil spring 30 provided in the door 20, and is provided with the damper not illustrated in the drawing that reduces the impact of closing the entrance 1212, and therefore, the operation of reversing the electric motor 66 at the open position of the door 20 may be omitted. In this case, it suffices to set the electric motor 66 to a free state where the output shaft 6602 is rotatable by stopping the supply of the driving signal from the control unit 48 to the electric motor 66, i.e., by stopping the energization to the electric motor 66, instead of reversing the electric motor 66.

It should be noted that reversing the electric motor 66 at the open position of the door 20 can move the door 20 from the open position to the closed position of the door 20 at the desired speed, which is advantageous in reducing the impact and noise of the door 20 forcefully moved to the closed position, and is therefore advantageous in providing a high-end look to the aircraft lavatory unit 10.

As illustrated in FIGS. 5 and 11, at a location relatively closer to the second side wall 1208B between the front wall 1204 and the rear wall 1206, a decorative panel 68 that covers from the lower side of the lavatory 1002 the upper portion of the bracket 50 and the roller 5204 making up the engaged member 40, the arm 42A making up the engaging member 42, the power transmission mechanism 46, and the electric motor 66 to hide the upper portion of the bracket 50, the roller 5204, the arm 42A, and the power transmission mechanism 46 is provided such that the user of the aircraft lavatory unit 10 is not able to visually recognize them, thus ensuring the aesthetics in the lavatory 1002.

The decorative panel 68, made of synthetic resin, is attached to the front wall 1204 and uprightly attached to the ceiling wall 1210 relatively closer to the rear wall 1206 in the front-rear direction of the lavatory 1002. The decorative panel 68 is attached to the second side wall 1208B on one side in the width direction of the lavatory 1002 and uprightly attached to the ceiling wall 1210 on the other side in the width direction of the lavatory 1002.

As illustrated in FIG. 11, the decorative panel 68 is provided with a long groove 6802 where the upper portion of the bracket 50 protrudes to the upper side of the lavatory 1002.

The long groove 6802 extends along the movement trajectory of the upright plate part 5004 of the bracket 50 that moves along with the movement of the first door member 22 between the closed position and the open position so as to allow for smooth movement of the bracket 50, i.e., smooth movement of the engaged member 40 (the roller 5204), thus achieving smooth swing of the arm 42A between the initial position and the open position. As illustrated in FIG. 4B, the inclination angle $\theta$ of the upright plate part 5004 of the bracket 50 with respect to the first door member 22 is set such that the width of the long groove 6802 is minimized.

As illustrated in FIG. 15, a door stop detection piece 4626 and a door open detection piece 4628 are provided in a projecting manner on both sides of the moving bracket 4620 in the arrangement direction of the pair of toothed moving pulleys 4614A and 4614B.

The support frame 4602 is provided with a door closing sensor 70 and a door opening sensor 72.

The door closing sensor 70 is provided to detect the door stop detection piece 4626 when the arm 42A is set to the initial position and the pair of toothed moving pulleys 4614A and 4614B is located at the rear end position, i.e., at the closed position of the door 20.

The door opening sensor 72 is provided to detect the door open detection piece 4628 when the arm 42A is set to the open position and the pair of toothed moving pulleys 4614A and 4614B is located at the front end position, i.e., at the open position of the door 20.

The door closing sensor 70 and the door opening sensor 72 are composed of photointerrupters, for example.

As illustrated in FIG. 17, the control unit 48 controls the forward and reverse rotation of the electric motor 66, or more specifically, the rotation amount (rotation angle) and rotational speed of the electric motor 66 (stepper motor) on the basis of detection signals of the human detecting sensor 38, the outdoor non-contact sensor 36A, the indoor non-contact sensor 36B, the door closing sensor 70, and the door opening sensor 72.

Through the control of the electric motor 66 by the control unit 48, the movement of the arm 42A between the initial position and the open position is controlled, and thus the movement of the door 20 between the closed position and the open position is controlled.

Figure 18:
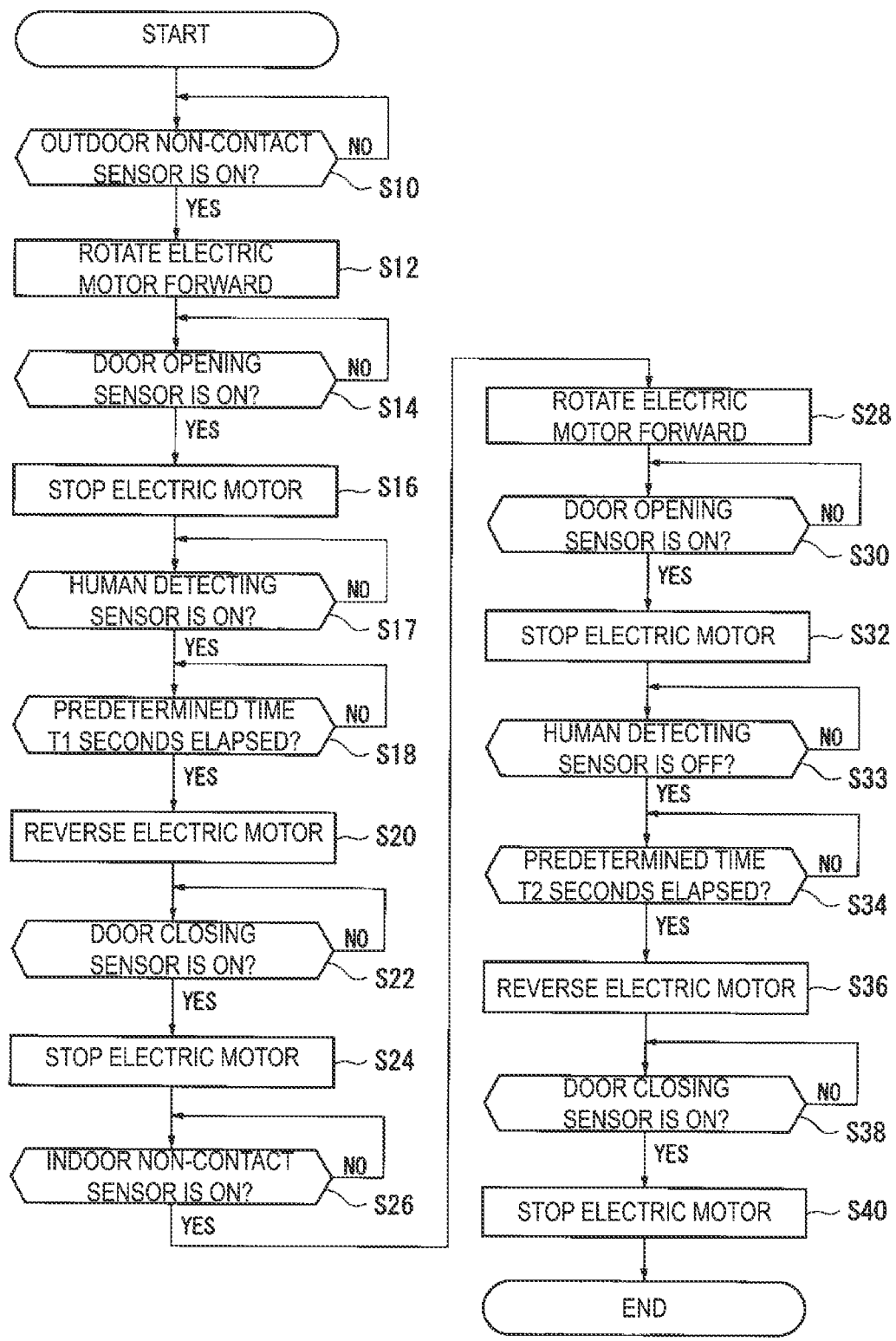
FIG. 18 is a flowchart illustrating an operation of the powered door opening mechanism.

Next, an operation of the powered door opening mechanism 34 of the present embodiment is described with reference to the flowchart of FIG. 18.

In the following description of the operation of the powered door opening mechanism 34, the control operation of the powered door opening mechanism 34 actually implemented is simplified or changed for the sake of simplify the description.

It is assumed that in the initial state, the lavatory 1002 is not used and the door 20 is located at the closed position.

The control unit 48 determines whether the detection signal of the outdoor non-contact sensor 36A is on (step S10).

The user of the lavatory 1002 turns on the detection signal of the outdoor non-contact sensor 36A by holding a hand over the outdoor non-contact sensor 36A to use the lavatory 1002.

When the detection signal of the outdoor non-contact sensor 36A is on, the control unit 48 rotates the electric motor 66 forward, and thus the door 20 is moved to the open position through the power transmission mechanism 46 (step S12).

The control unit 48 detects whether the detection signal of the door opening sensor 72 is on (step S14).

When the detection signal of the door opening sensor 72 is on, the control unit 48 stops the electric motor 66 (step S16). As a result, the door 20 is located at the open position, and therefore the user of the entrance 1212 of the lavatory 1002 enters the lavatory 1002.

Next, the control unit 48 determines whether the detection signal of the human detecting sensor 38 is on (step S17).

When step S17 is negative, step S17 is repeated, whereas when step S17 is positive, it is determined whether a predetermined time T1 (sec) has elapsed after step S17 becomes positive (step S18). The predetermined time T1 is, for example, 5 seconds.

When step S18 is negative, step S18 is repeated.

When step S18 is positive, i.e., when the door 20 is located at the open position and the predetermined time T1 has elapsed in the state where the user has entered the lavatory 1002 and the detection signal of the human detecting sensor 38 is on, the control unit 48 reverses the electric motor 66, and thus the door 20 is moved to the closed position through the power transmission mechanism 46 (step S20).

The control unit 48 determines whether the detection signal of the door closing sensor 70 is on (step S22).

When the detection signal of the door closing sensor 70 is on, the control unit 48 stops the electric motor 66 (step S24). In this manner, the state where the door 20 is located at the closed position is maintained.

Next, the control unit 48 determines whether the detection signal of the indoor non-contact sensor 36B is on (step S26).

When the detection signal of the indoor non-contact sensor 36B is on, the control unit 48 rotates the electric motor 66 forward, and thus the door 20 is moved to the open position through the power transmission mechanism 46 (step S28).

Thus, when the use of the lavatory 1002 is completed, the user turns on the detection signal of the indoor non-contact sensor 36B by holding a hand over the indoor non-contact sensor 36B to leave the lavatory 1002, and leaves the lavatory 1002 to the outside from the entrance 1212 when the door 20 is moved to the open position.

The control unit 48 determines whether the detection signal of the door opening sensor 72 is on (step S30).

When the detection signal of the door opening sensor 72 is on, the control unit 48 stops the electric motor 66 (step S32) and determines whether the detection signal of the human detecting sensor 38 is off (step S33).

When step S33 is negative, step S33 is repeated, whereas when step S33 is positive, it is determined whether a predetermined time T2 (sec) has elapsed after step S33 has become positive (step S34). The predetermined time T2 is, for example, 9 seconds.

When step S34 is negative, step S34 is repeated.

When step S34 is positive, i.e., when the predetermined time T2 has elapsed in the state where the door 20 is located at the open position and the human detecting sensor 38 is detection off with no user inside the lavatory 1002, the control unit 48 reverses the electric motor 66, and thus the door 20 is moved to the closed position through the power transmission mechanism 46 (step S36).

The control unit 48 determines whether the detection signal of the door closing sensor 70 is on (step S38).

The control unit 48 stops the electric motor 66 when the detection signal of the door closing sensor 70 is on (step S40). In this manner, the state where the door 20 is located at the closed position is maintained.

Thereafter, the process is returned to step S10 and the same operations are repeated.

Now the reason why the torsion coil spring 62 that biases the arm 42A to the initial position and the open position stopper 64 that sets the initial position of the arm 42A are provided is described.

The crews such as cabin attendants and cleaners fix the door 20 to the open position prior to the cleaning operation of the lavatory 1002.

More specifically, in the state where the door 20 is moved to the open position by holding a hand over the outdoor non-contact sensor 36A, a flap not illustrated in the drawing provided at the entrance 1212 is protruded so as to engage the flap with the portion of the door 20 located at the open position and fix the door 20 to the open position.

At this time, when the crew enters the lavatory 1002, the detection signal of the human detecting sensor 38 turns on and the control unit 48 executes the operation of moving the door 20 from the open position to the closed position, and as a result, the electric motor 66 is reversed and the belt 4604 is fed to the arm 42A with the door 20 fixed to the open position.

In this case, if an initial position stopper 64 and the torsion coil spring 62 that brings the arm 42A into contact with the initial position stopper 64 are not provided, the arm 42A remains at the open position, thus causing a defect in which the fed belt 4604 deflects and hangs between the toothed driving pulley 4606 and the end of the arm 42A.

In view of this, with the torsion coil spring 62 that biases the arm 42A to the initial position and the initial position stopper 64 that sets the initial position of the arm 42A, the arm 42A reliably returns to the initial position while following the fed belt 4604, and the fed belt 4604 does not deflect or hang.

When the cleaning operation of the lavatory 1002 is completed, the crew releases the flap from the portion of the door 20, and the door 20 returns from the open position to the closed position with the biasing force of the torsion coil spring 30 of the door 20.

In this manner, the door 20 is set to the closed position and the arm 42A has already been at the initial position, and thus, the opening and closing operation of the door 20 can be executed thereafter without any trouble.

As described above, according to the present embodiment, with the powered door opening mechanism 34 provided in the door opening and closing mechanism 18 of the existing aircraft lavatory unit 10, the user of the lavatory 1002 can enter and leave the lavatory 1002 without contacting the door 20, which is advantageous in easily installing the powered door opening mechanism 34 in the aircraft lavatory unit 10 of an existing aircraft already in operation, not to mention that the powered door opening mechanism 34 can be installed together with the door opening and closing mechanism 18 when newly manufacturing the aircraft lavatory unit 10, and is advantageous in preventing the transmission of novel coronavirus in the interior.

The engaging member 42 is formed in a shape opening in the direction away from the door 20 and engage with the engaged member 40 from the door 20 side, and therefore when the door 20 is manually moved from the closed position to the open position, the engaged member 40 moves in the direction away from the entrance 1212, and, the engaged member 40 does not engage with the engaging member 42.

Thus, the door 20 can be moved from the closed position to the open position with the powered door opening mechanism 34 while ensuring the state where the manual open operation of the door 20 is enabled.

Therefore, even in the state where power supply to the actuator 44 is stopped and the operation of the actuator 44 is stopped during maintenance of the aircraft lavatory unit 10, the door 20 can be manually opened, which is advantageous in smoothly efficiently performing the maintenance operation.

Even when there is the user (passenger) who is unaware of the non-contact sensor 36, the user can manually move the door 20 from the closed position to the open position without interfering with the powered door opening mechanism 34 as in the related art, which is advantageous in increasing the user-friendliness of the door opening and closing mechanism 18 of the entrance 1212 of the aircraft lavatory unit 10.

Even if the powered door opening mechanism 34 is in a fault state, the door 20 can be manually opened, and therefore the user can use the lavatory 1002 without any trouble, which is advantageous in improving the convenience of the aircraft lavatory unit 10.

The engaging member 42 engages with the engaged member 40 from the entrance 1212 side, but the engaging member 42 and the engaged member 40 are not coupled with each other.

Therefore, even in a situation where the user in poor health collapses inside the lavatory 1002 and the door 20 cannot be opened due to the door 20 interfering with the collapsed user, the door 20 can be detached by tilting the door 20 located at the closed position from the outside of the lavatory 1002 such that the roller 5204 is located on the lower side of the bent plate part 4206, and thus the collapsed user can be quickly and reliably rescued, which is advantageous in smoothly dealing with emergency situations.

In the case where the first door member 22 and the second door member 24 linearly extend at the closed position of the door 20 in plan view, the door 20 can be moved from the closed position to the open position even by moving the engaging member 42 in the width direction of the lavatory 1002 orthogonal to the front-rear direction of the lavatory 1002, but in the case where the part 26 where the first door member 22 and the second door member 24 are coupled is displaced in the direction away from the lavatory 1002 more than both ends of the door 20 in the width direction in plan view as in embodiment, the door 20 cannot be moved from the closed position to the open position when moving the engaging member 42 in the width direction of the lavatory 1002 orthogonal to the front-rear direction of the lavatory 1002.

In view of this, in the present embodiment, the engaging member 42 is moved in the direction away from the entrance 1212 that is the front-rear direction of the lavatory 1002, and thus the door 20 can be moved from the closed position to the open position in both the case where the first door member 22 and the second door member 24 linearly extend at the closed position of the door 20 in plan view, and the case where the part 26 where the first door member 22 and the second door member 24 are coupled is displaced in the direction away from the lavatory 1002 more than both ends of the door 20 in the width direction.

Thus, with the powered door opening mechanism 34 provided in the door opening and closing mechanism 18 of the existing aircraft lavatory unit 10, the user can enter and leave the lavatory 1002 without contacting the door 20 regardless of the close state of the door 20, which is advantageous in preventing the transmission of novel coronavirus in the interior.

In the present embodiment, since the sink 16 is provided at the first side wall 1208A and the powered door opening mechanism 34 is disposed closer to the second side wall 1208B, the powered door opening mechanism 34 does not interfere with the user, i.e., does not interfere with the user of the lavatory 1002 even when the user stands in front of the sink 16 during use of the sink 16, which is advantageous in disposing the powered door opening mechanism 34.

In the present embodiment, the engaging member 42 and the actuator 44 are disposed closer to the ceiling wall 1210 and covered with the decorative panel 68 from below, and the decorative panel 68 is provided with the long groove 6802 that enables the movement of the bracket 50, which is advantageous in smoothly performing the operation of the powered door opening mechanism 34 and ensuring the aesthetics of the inside of the lavatory 1002, and is also advantageous in preventing the user of the lavatory 1002 from inadvertently making contact with the engaging member 42 and the powered door opening mechanism 34.

While the engaging member 42 and the actuator 44 may be disposed closer to the ceiling wall 1210 and attached to the second side wall 1208B, attaching them on the ceiling wall 1210 as in embodiment is advantageous in ensuring the aesthetics of the inside of the lavatory 1002.

In the present embodiment, since the powered door opening mechanism 34 includes the power transmission mechanism 46 that couples the engaging member 42 and the actuator 44 and transmits the power of the actuator 44 to the engaging member 42, the power of the actuator 44 can be smoothly and reliably transmitted to the engaging member 42, which is advantageous in smoothly moving the door 20 from the closed position to the open position.

With the power transmission mechanism 46, the actuator 44 can be more freely installed and laid out by, for example, disposing the actuator 44 at a location that does not interfere with the user of the lavatory 1002, which is advantageous in easily installing the powered door opening mechanism 34 in the door opening and closing mechanism 18 of the existing aircraft lavatory unit 10.

For example, the actuator 44 may be disposed at a location relatively closer to the second side wall 1208B on the lateral side of the toilet 14 in the vicinity of the floor board 1202.

It should be noted that disposing the power transmission mechanism 46 and the actuator 44 as in the embodiment is advantageous in ensuring the aesthetics of the inside of the lavatory 1002 and is also advantageous in achieving size reduction and weight reduction of the powered door opening mechanism 34.

While the powered door opening mechanism 34 including the power transmission mechanism 46 may be attached to the second side wall 1208B on the side relatively closer to the ceiling wall 1210, attaching the powered door opening mechanism 34 including the power transmission mechanism 46 at a location relatively closer to the ceiling wall 1210 and relatively closer to the second side wall 1208B as in embodiment is advantageous in achieving size reduction and weight reduction of the powered door opening mechanism 34 by reducing the number of components making up the power transmission mechanism 46.

In the present embodiment, the support frame 4602 that supports the actuator 44 and the power transmission mechanism 46 is provided, which is advantageous in easily installing the powered door opening mechanism 34 in the door opening and closing mechanism 18 of the existing aircraft lavatory unit 10, and is also advantageous in preventing the transmission of novel coronavirus in the interior.

In the present embodiment, the door 20 is of folding type and includes the first door member 22 rotatably supported at a section of the front wall closer to the second side wall 1208B and the second door member 24 foldably coupled with the first door member 22, and the engaged member 40 is provided in the first door member 22, which is advantageous in disposing the powered door opening mechanism 34 on the side relatively closer to the second side wall 1208B inside the lavatory 1002 as illustrated in FIGS. 11 and 12, and is also is advantageous in disposing the powered door opening mechanism 34 at a location where it does not interfere with the user of the lavatory 1002.

In the present embodiment, since the engaged member 40 is composed of the rotatable roller 5204, engagement with the engaging member 42 can be smoothly performed, which is advantageous in smoothly moving the door 20 from the closed position to the open position with the powered door opening mechanism 34.

While the electric motor 66 that is an electric actuator is used as the actuator 44 in the above-described embodiment, various publicly known actuators such as a hydraulic actuator such as a hydraulic motor and a hydraulic cylinder, and a pneumatic actuator such as a pneumatic motor and a pneumatic cylinder can be used as the actuator 44.

It should be noted that for the aircraft lavatory unit 10 with strict weight reduction requirements, the use of an electric actuator as the actuator 44 is advantageous in achieving weight reduction because hydraulic actuators and pneumatic actuators require hydraulic pumps and compressors.

Actuators of other types such as electric cylinders may be used as the electric actuator, and the structure of the power transmission mechanism 46 is set as necessary in accordance with the type of the actuator 44, but the use of the electric motor 66 is advantageous in achieving size reduction of the powered door opening mechanism 34 including the power transmission mechanism 46.

While the belt/pulley mechanism 46A is used as the power transmission mechanism 46 in the above-described case, various publicly known mechanisms such as slider crank mechanisms and cam mechanisms may be employed as the power transmission mechanism 46. However, the use of the belt/pulley mechanism 46A as in the embodiment is advantageous in achieving weight reduction and size reduction of the powered door opening mechanism 34.

Second Embodiment

Next, a second embodiment is described with reference to FIGS. 19 to 22.

In the following description, the same parts and components as those of the above-described first embodiment are denoted with the same the reference numerals and their description is omitted to mainly describe differences.

The second embodiment is different from the first embodiment in that an electric linear actuator 74 is used as the actuator 44, and that the power transmission mechanism 46 is omitted.

Figure 19:
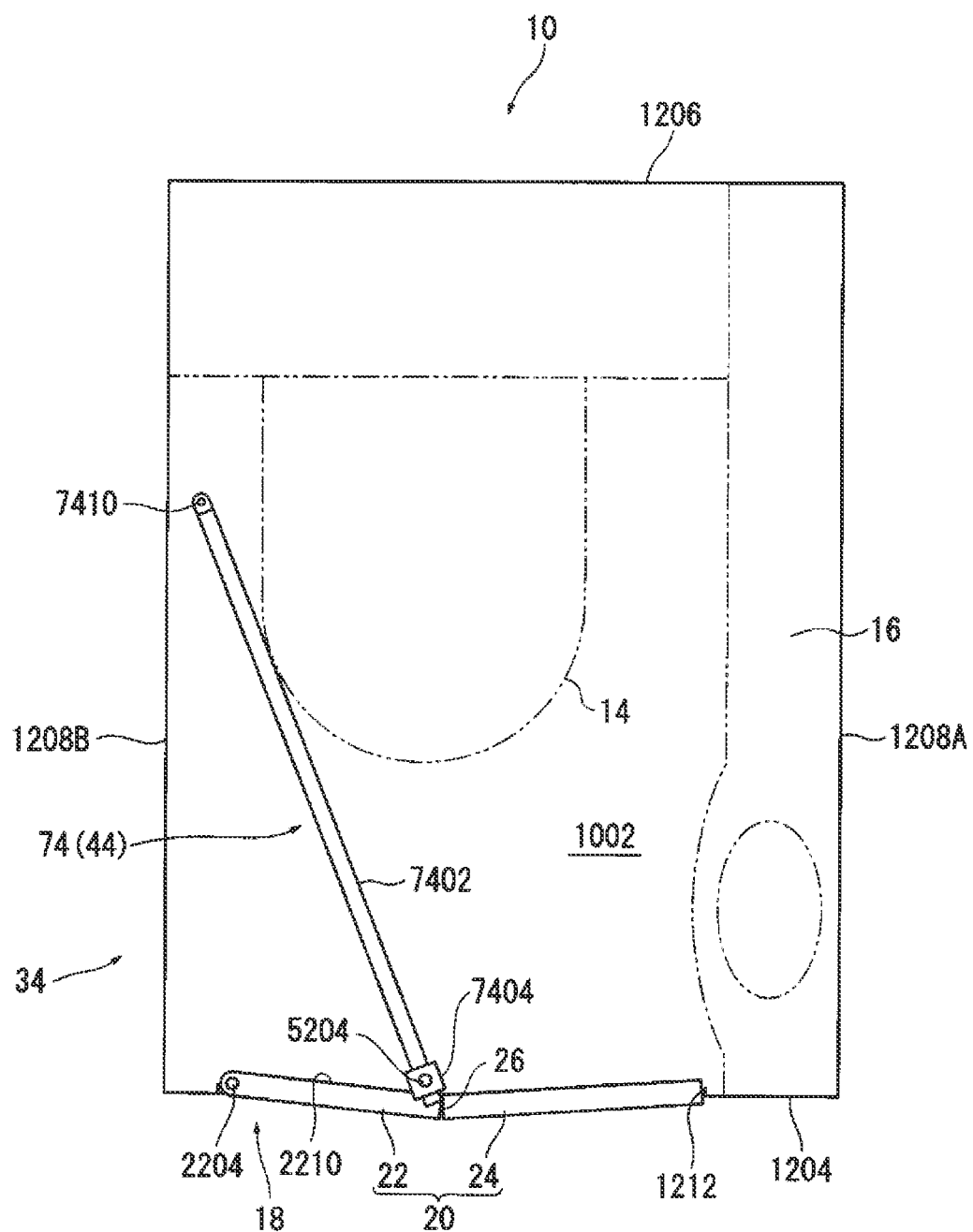
FIG. 19 is a schematic plan view of a powered door opening mechanism of a second embodiment in a state where the door is located at the closed position.
Figure 20:
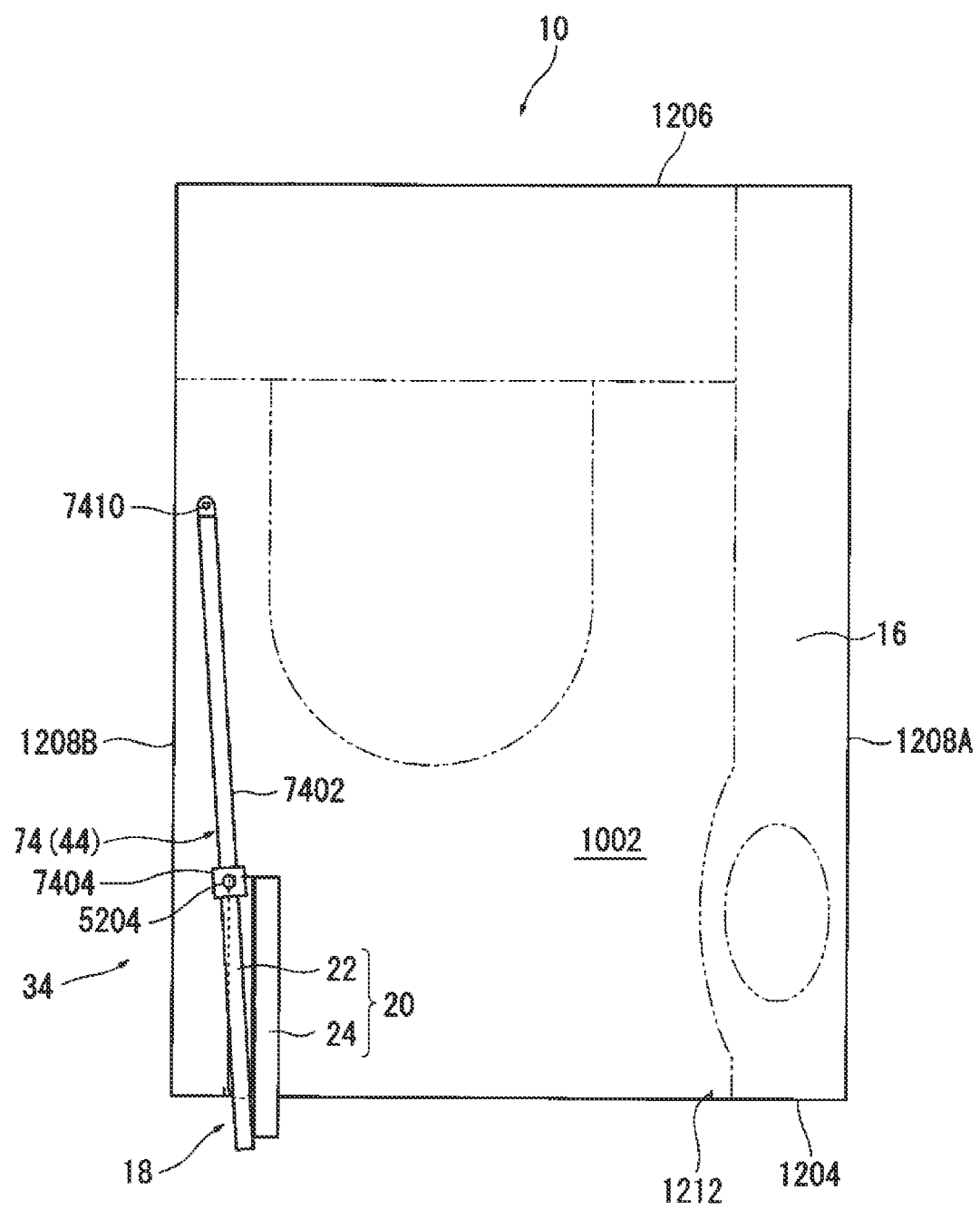
FIG. 20 is a schematic plan view of the powered door opening mechanism of the second embodiment in a state where the door is located at the open position.

As illustrated in FIGS. 19 and 20, the electric linear actuator 74 includes a shaft 7402 with a slender elongated shape, and a slider 7404 provided to be movable along the longitudinal direction of the shaft 7402 and non-rotatable around the axial center of the shaft 7402.

The electric linear actuator 74 is disposed at a location on the upper side of the door 20 and relatively closer to the second side wall 1208B.

The shaft 7402 includes magnets arranged in the longitudinal direction, and the N pole and S pole of each magnet alternate along the longitudinal direction of the shaft 740.

The base end as one end of the shaft 7402 in the longitudinal direction is supported swingably in the horizontal direction by a support shaft 7410 disposed at a location relatively closer to the second side wall 1208B and relatively closer to the ceiling wall 1210 with the axial center aligned with the up-down direction, and the tip end as the other end of the shaft 7402 in the longitudinal direction extends to the direction of the entrance 1212. In the present embodiment, the support shaft 7410 is attached to the ceiling wall 1210.

The slider 7404 is provided with a build-in coil, and when a thrust is generated at the slider 7404 through the magnetism interaction between the magnetic field generated at the coil with a driving signal supplied to the coil from the control unit 48 and the magnetic field of each magnet, the slider 7404 moves back and forth straight along the longitudinal direction of the shaft 7402, i.e., moves in the direction toward and away from the entrance 1212.

Figure 22:
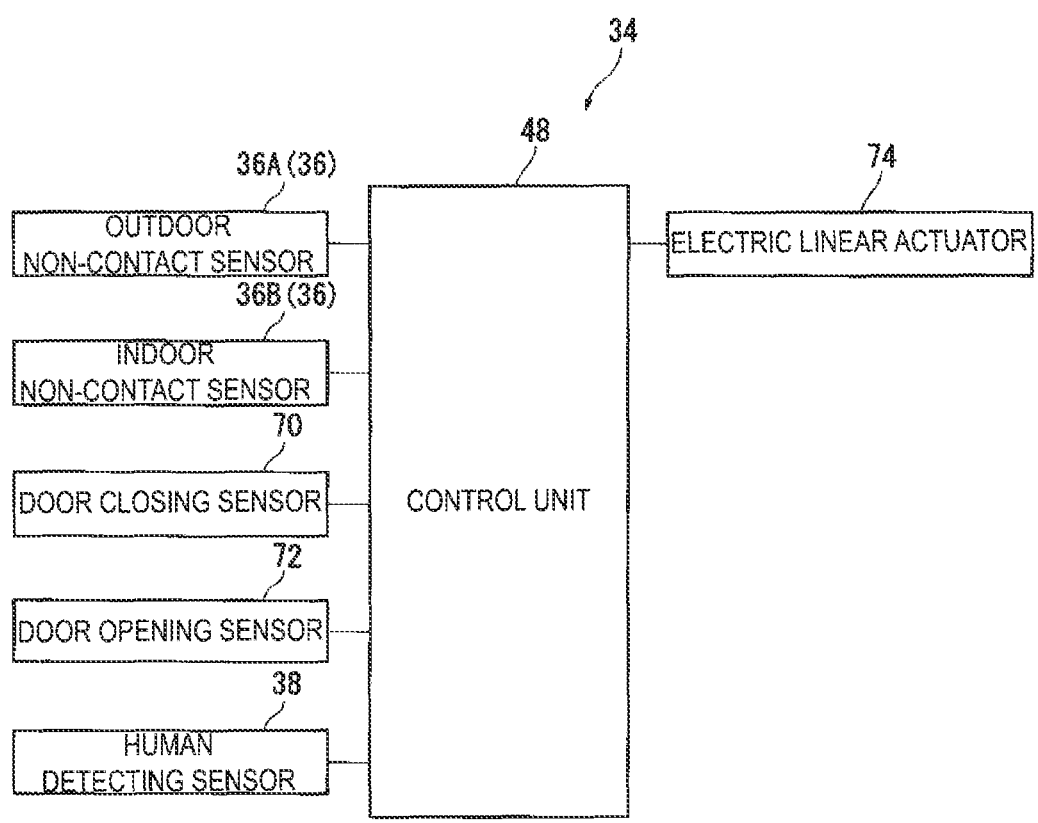
FIG. 22 is a block diagram illustrating a configuration of a control system of the powered door opening mechanism of the second embodiment.

As illustrated in FIG. 22, in the second embodiment, the outdoor non-contact sensor 36A, the indoor non-contact sensor 36B, the door closing sensor 70, the door opening sensor 72, the human detecting sensor 38, and the control unit 48 as those of the first embodiment are provided.

The control unit 48 controls the movement direction and movement stroke of the slider 7404 by supplying to the coil of the slider 7404 the driving signal generated based on the detection signal of the above-described sensors.

With reference to FIGS. 4A-4B again, as in the first embodiment, the engaged member 40 is located on the inner surface side of the door 20 located inside the lavatory 1002 and on the upper side of the door 20.

The bracket 50 is provided at the upper end of the first door member 22, and the engaged member 40 is composed of the roller 5204 provided at the mounting plate part 5006 of the bracket 50.

Figure 21:
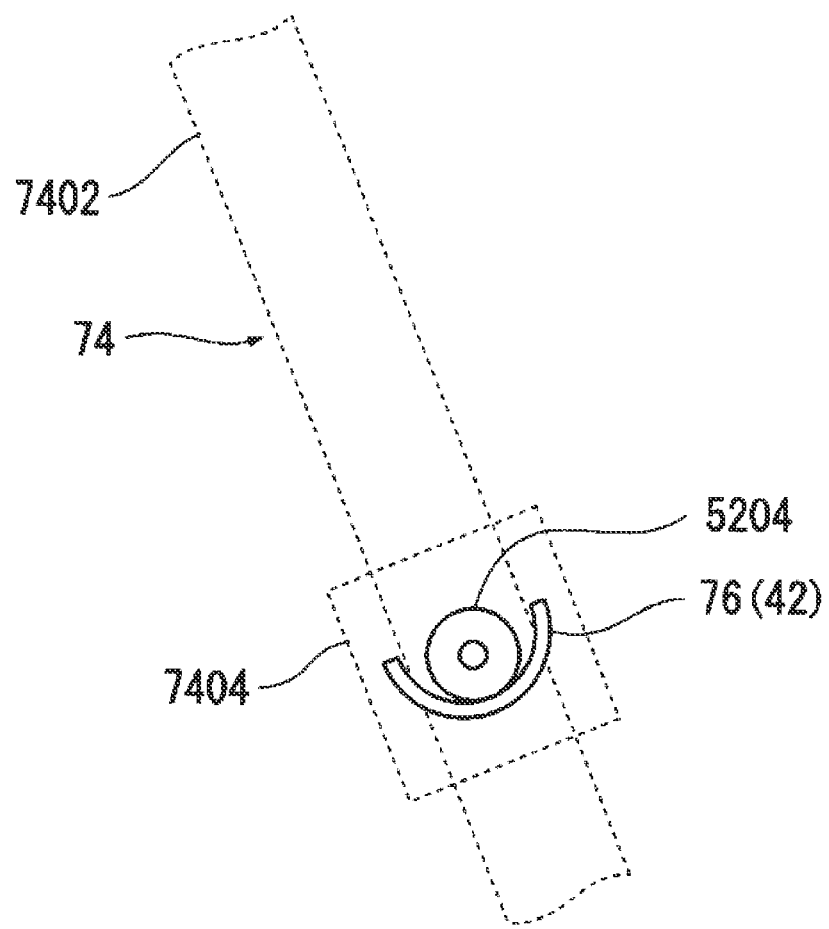
FIG. 21 is a plan view illustrating a relationship between a roller making up an engaged member provided in a first door member and a curved plate making up an engaging member provided in a slider.

As illustrated in FIG. 21, a curved plate 76 making up the engaging member 42 extended in a curved shape is provided at the bottom surface of the slider 7404.

The curved plate 76 is provided at a location on the upper side of the door 20 inside the lavatory 1002, and is provided in a shape that opens in the direction away from the door 20 and is engageable with the roller 5204 from the door 20 side from the closed position of the door 20 to the open position of the door 2.

Thus, when the door 20 is manually opened, the roller 5204 provided in the first door member 22 moves in the direction away from the entrance 1212 without interfering the engaging member 42, and thus, the operation of manually moving the door 20 from the closed position to the open position is smoothly performed even with the powered door opening mechanism 34.

Although omitted in FIGS. 19 and 20, as in the first embodiment, the decorative panel 68 that covers the electric linear actuator 74 from below is provided, and the decorative panel 68 is provided with the long groove 6802 that extends along the movement trajectory of the upright plate part 5004 of the bracket 50 that moves along with the movement of the first door member 22 between the closed position and the open position. The bracket 50 can smoothly move at the long groove 6802 (see FIG. 11).

As illustrated in FIG. 19, at the closed position of the door 20, the slider 7404 is located at the initial position relatively closer to the end of the shaft 7402, the slider 7404 moves in the direction away from the entrance 1212 along the shaft 7402 with the detection signal of the outdoor non-contact sensor 36A, and the first door member 22 moves from the closed position to the open position through the engagement of the curved plate 76 and the roller 5204.

When the slider 7404 moves along the shaft 7402 in the direction away from the entrance 1212, the first door member 22 moves from the closed position to the open position, and therefore the shaft 7402 follows the movement of the first door member 22 to swing in the direction in which its end approaches the second side wall 1208B with the support shaft 7410 as a fulcrum.

Then, as illustrated in FIG. 20, the first door member 22 and the second door member 24 overlap at the open position of the door 20 such that the slider 7404 is set to the open position, and that the end side portion of the shaft 7402 and the slider 7404 are located over the overlapped first door member 22 and second door member 24.

As in the first embodiment, the movement of the door 20 from the open position to the closed position is performed such that the movement of the roller 5204 in the direction toward the entrance 1212 and the movement of the door 20 from the open position to the closed position are constrained by the curved plate 76 due to the roller 5204 engaged with the curved plate 76 against the biasing force of the torsion coil spring 30 provided in the door 20, and the movement of the roller 5204 in the direction toward the entrance 1212 and the movement of the door 20 from the open position to the closed position are performed in accordance with the movement amount of the slider 7404 along the longitudinal direction of the shaft 7402, thus noiselessly and quietly setting the door 20 to the closed position.

The door 20 is biased to move to the closed position with the biasing force of the torsion coil spring 30 provided in the door 20, and is provided with the damper not illustrated in the drawing that reduces the impact of closing the entrance 1212, and therefore the movement of the slider 7404 in the direction toward the entrance 1212 at the open position of the door 20 may be omitted.

In this case, it suffices to set the slider 7404 to a free state that is movable along the shaft 7402 by stopping the supply of the driving signal from the control unit 48 to the slider 7404, i.e., stopping the energization to the coil instead of moving the slider 7404 in the direction toward the entrance 1212.

As described below, the operation of the powered door opening mechanism 34 when the user enters and leaves the lavatory 1002 is performed as in the first embodiment.

Specifically, when the user of the lavatory 1002 turns on the detection signal of the outdoor non-contact sensor 36A by holding a hand over the outdoor non-contact sensor 36A, the slider 7404 of the electric linear actuator 74 moves in the direction away from the entrance 1212 so as to move the door 20 to the open position, and the user enters the lavatory 1002.

Next, when the slider 7404 is moved in the direction toward the entrance 1212 i.e., when the slider 7404 is moved to the initial position after the predetermined time T1 has passed in the state where the entry of the user of the lavatory 1002 into the lavatory 1002 has been detected by the human detecting sensor 38 and the door 20 is set to the open position, the door 20 can be moved from the open position to the closed position of the door 20 at the desired speed, which is advantageous in suppressing the impact and noise of the door 20 forcefully moved to the closed position, and is therefore advantageous in providing a high-end look to the aircraft lavatory unit 10.

When the user turns on the detection signal of the indoor non-contact sensor 36B by holding a hand over the indoor non-contact sensor 36B after using the lavatory 1002, the slider 7404 of the electric linear actuator 74 moves in the direction toward the entrance 1212 so as to move the door 20 to the open position, and the user leaves the lavatory 1002 to the outside from the entrance 1212.

Thereafter, after the predetermined time T2 has passed in the state where the door 20 is located at the open position and the detection signal of the human detecting sensor 38 is off, the slider 7404 of the electric linear actuator 74 moves in the direction toward the entrance 1212, and the door 20 is moved to the closed position.

The second embodiment also achieves the same effects as those of the first embodiment, and the second embodiment is more advantageous in reducing the weight of the powered door opening mechanism 34 in comparison with the first embodiment because the power transmission mechanism 46 is omitted.

The present technology is also naturally applicable to a case where the door 20 for opening and closing the entrance 1212 of the lavatory 1002 is composed of a single openable and closable door 20.

The invention claimed is:

1. A door opening and closing mechanism of an entrance of an aircraft lavatory unit, the door opening and closing mechanism comprising:
   a door manually movable between a closed position for closing the entrance of the aircraft lavatory unit and an open position for opening the entrance and always biased to be at the closed position; and
   a powered door opening mechanism configured to move the door from the closed position to the open position; the powered door opening mechanism comprising a non-contact sensor provided inside and outside the aircraft lavatory unit and configured to detect part of a human body, an engaged member provided on the door and disposed on an inner surface side of the door located inside the aircraft lavatory unit and on an upper side of the door, the engaged member being movable within a long groove along with movement of the door between the closed position and the open position, the long groove being in a fixed position independent of movement of the door, and the long groove being formed in the aircraft lavatory unit near an upper end of the door, an engaging member provided at a section on the upper side of the door inside the aircraft lavatory unit, engageable with the engaged member from a side of the door from the closed position of the door to the open position of the door, and having a shape that is open in a direction away from the door, and an actuator configured to move the engaging member in a direction away from the entrance in response to a detection signal from the non-contact sensor and move the door from the closed position to the open position through the engaged member.

2. The door opening and closing mechanism of an entrance of the aircraft lavatory unit according to claim 1, wherein the aircraft lavatory unit comprises a front wall provided with the entrance and a first side wall and a second side wall connected to both ends of the front wall and facing each other, the first side wall is provided with a sink, and the powered door opening mechanism is provided closer to a side of the second side wall.

3. The door opening and closing mechanism of an entrance of the aircraft lavatory unit according to claim 2, wherein the engaging member and the actuator are disposed closer to a ceiling wall configured to partition a ceiling of the aircraft lavatory unit, a decorative panel configured to cover the engaged member, the engaging member, and the actuator from below is provided, and the decorative panel is provided with the long groove.

4. The door opening and closing mechanism of an entrance of the aircraft lavatory unit according to claim 1, wherein the non-contact sensor is an outdoor non-contact sensor provided outside the aircraft lavatory unit, and the actuator moves the engaging member in the direction away from the entrance at the closed position of the door in response to a detection signal of the outdoor non-contact sensor and moves the engaging member in a direction toward the entrance after a predetermined time has elapsed in a state where the door is located at the open position and entry of a user of the aircraft lavatory unit into the aircraft lavatory unit is detected by a human detecting sensor provided in the aircraft lavatory unit.

5. The door opening and closing mechanism of an entrance of the aircraft lavatory unit according to claim 3, wherein the powered door opening mechanism comprises a power transmission mechanism coupling the engaging member and the actuator and configured to transmit power of the actuator to the engaging member.

6. The door opening and closing mechanism of an entrance of the aircraft lavatory unit according to claim 5, wherein the power transmission mechanism is disposed closer to the ceiling wall and is covered with the decorative panel from below.

7. The door opening and closing mechanism of an entrance of the aircraft lavatory unit according to claim 6, wherein a support frame supporting the actuator and the power transmission mechanism and attached to the ceiling wall is provided, and the actuator and the power transmission mechanism are attached to the ceiling wall through the support frame.

8. The door opening and closing mechanism of an entrance of the aircraft lavatory unit according to claim 1, wherein the door is of folding type and comprises a first door member rotatably supported at a section of the front wall closer to the second side wall and a second door member foldably coupled with the first door member, and the engaged member is provided at an upper end of the first door member.

9. A door opening and closing mechanism of an entrance of an aircraft lavatory unit, the door opening and closing mechanism comprising:

a door manually movable between a closed position for closing the entrance of the aircraft lavatory unit and an open position for opening the entrance and always biased to be at the closed position; and a powered door opening mechanism configured to move the door from the closed position to the open position;

the powered door opening mechanism comprising a non-contact sensor provided inside and outside the aircraft lavatory unit and configured to detect part of a human body, an engaged member provided on the door and disposed on an inner surface side of the door located inside the aircraft lavatory unit and on an upper side of the door, an engaging member provided at a section on the upper side of the door inside the aircraft lavatory unit, engageable with the engaged member from a side of the door from the closed position of the door to the open position of the door, and having a shape that is open in a direction away from the door, and an actuator configured to move the engaging member in a direction away from the entrance in response to a detection signal from the non-contact sensor and move the door from the closed position to the open position through the engaged member, wherein a bracket protruding upward is provided at an upper end of the door, and the engaged member comprises a roller rotatably supported by the bracket.

* * * * *